US011485477B2

(12) United States Patent
Villabrille Prades

(10) Patent No.: US 11,485,477 B2
(45) Date of Patent: Nov. 1, 2022

(54) FLYING APPARATUS

(71) Applicant: PRADES IMASD, S.L., Madrid (ES)

(72) Inventor: Guillermo Ramiro Villabrille Prades, Madrid (ES)

(73) Assignee: PRADES IMASD, S.L., Madrid (ES)

( * ) Notice: Subject to any disclaimer, the term of this patent is extended or adjusted under 35 U.S.C. 154(b) by 111 days.

(21) Appl. No.: 17/045,757

(22) PCT Filed: Apr. 5, 2019

(86) PCT No.: PCT/EP2019/058652
§ 371 (c)(1),
(2) Date: Oct. 6, 2020

(87) PCT Pub. No.: WO2019/193158
PCT Pub. Date: Oct. 10, 2019

(65) Prior Publication Data
US 2021/0053672 A1 Feb. 25, 2021

(30) Foreign Application Priority Data
Apr. 6, 2018 (EP) ..................... 18382234

(51) Int. Cl.
*B64C 11/46* (2006.01)
*B64D 35/04* (2006.01)
(Continued)

(52) U.S. Cl.
CPC ............ *B64C 11/007* (2013.01); *B60L 8/003* (2013.01); *B60L 50/60* (2019.02); *B64C 9/00* (2013.01);
(Continued)

(58) Field of Classification Search
CPC .... B64C 11/007; B64C 27/52; B64C 29/0033
See application file for complete search history.

(56) References Cited

U.S. PATENT DOCUMENTS 1,753,112 A 4/1930 Engledow
2,020,235 A * 11/1935 Bradbury ................ B64C 11/00
416/223 R
(Continued)

FOREIGN PATENT DOCUMENTS

CN 107 380 428 A 11/2017

OTHER PUBLICATIONS

International Search Report and Written Opinion for PCT/EP2019/058652, dated Jul. 15, 2019.

*Primary Examiner* — Brian M O'Hara
(74) *Attorney, Agent, or Firm* — Marshall, Gerstein & Borun LLP

(57) ABSTRACT

A flying apparatus includes a main structure and a rotative wing surface, the rotation of the wing surface allowing stabilizing the apparatus (100). A fuselage hangs from the wing surface around a hanging point, allowing the wing surface and the fuselage be moveable independently with respect to each other and the wing surface is configured as a disc to manoeuvre the apparatus and including one or more elements acting as security and secondary command and control surfaces, orienting the apparatus in desired directions. The main structure and wing surface can overwrap at least partially the the fuselage in order to improve the aerodynamic performance.
The airframe or fuselage and the wing surface are rotatable around any of three rotational axes independently.

15 Claims, 20 Drawing Sheets

(51) Int. Cl.
*B64C 11/00* (2006.01)
*B60L 50/60* (2019.01)
*B60L 8/00* (2006.01)
*B64C 9/00* (2006.01)
*B64C 15/12* (2006.01)
*B64C 27/52* (2006.01)
*B64C 29/00* (2006.01)
*B64C 31/036* (2006.01)
*B64D 17/00* (2006.01)
*B64D 27/02* (2006.01)
*B64D 27/24* (2006.01)
*B64D 35/00* (2006.01)
*B64C 39/02* (2006.01)

(52) U.S. Cl.
CPC ............ *B64C 15/12* (2013.01); *B64C 27/52* (2013.01); *B64C 29/0033* (2013.01); *B64C 31/036* (2013.01); *B64D 17/00* (2013.01); *B64D 27/02* (2013.01); *B64D 27/24* (2013.01); *B64D 35/00* (2013.01); *B60L 2200/10* (2013.01); *B64C 39/026* (2013.01)

(56) References Cited

U.S. PATENT DOCUMENTS

| | | |
|---|---|---|
| 2,402,957 A | 7/1946 | Geddes |
| 2,529,033 A | 11/1950 | Linville |
| 2,711,295 A | 6/1955 | Peterson |
| 2,806,662 A | 9/1957 | Yonkers |
| 3,103,324 A | 9/1963 | Price |
| 3,104,853 A | 9/1963 | Klein |
| 3,118,504 A * | 1/1964 | Cresap .............. B64C 27/52 416/102 |
| 3,603,700 A * | 9/1971 | Eskeli .............. B64C 39/064 416/175 |
| 3,946,970 A | 3/1976 | Blankenship |
| 4,195,800 A * | 4/1980 | Wallace .............. B64C 27/10 416/114 |
| 4,913,376 A | 4/1990 | Black |
| 5,240,204 A | 8/1993 | Kunz |
| 5,503,351 A | 4/1996 | Vass |
| 5,727,754 A | 3/1998 | Carter, Jr. |
| 6,062,508 A | 5/2000 | Black |
| 6,450,446 B1 * | 9/2002 | Holben .............. B64C 27/00 244/6 |
| 2004/0113013 A1 | 6/2004 | Pica |

\* cited by examiner

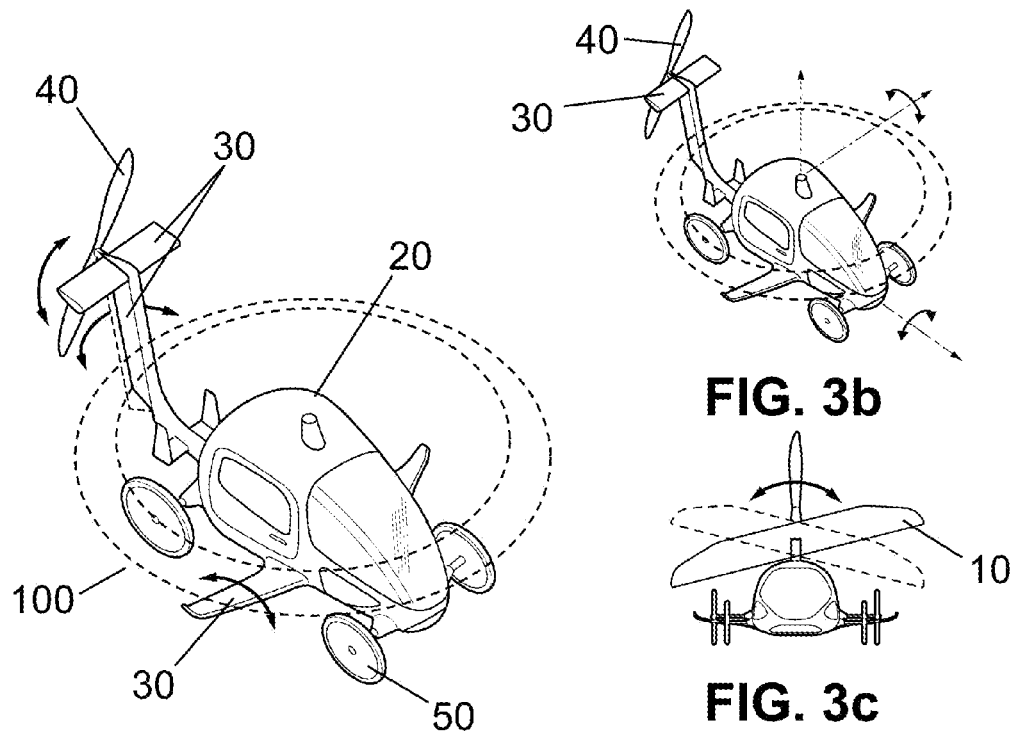
FIG. 3a
FIG. 3b
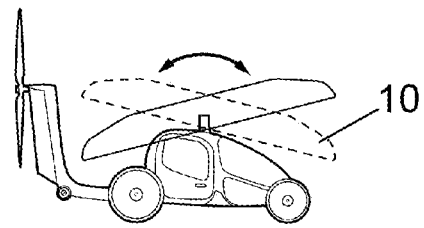
FIG. 3c
FIG. 3d
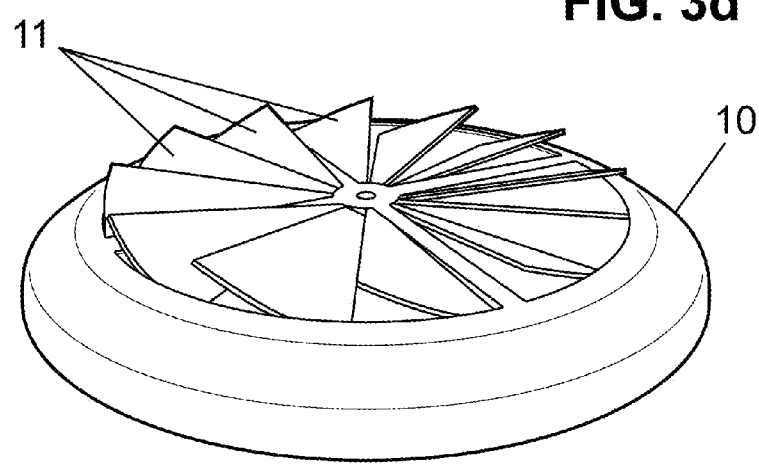
FIG. 4

FLYING APPARATUS

FIELD OF THE INVENTION

The present invention is in the field of aeromechanics and aerodynamics and relates to a novel and inventive flying apparatus or aircraft, suitable for both human and/or goods transport.

BACKGROUND OF THE INVENTION

Since the beginning of aeronautics, the problem of aerodynamics lift has been joined to aircraft stability and control. Whenever the aircraft is in the terrestrial atmosphere, the aerodynamic lift is obtained by the vertical resulting pressure force made by the air over the overall contour of the aircraft being higher (and in opposite direction) to the weight of the aircraft. When the aircraft displaces in a certain direction, the pressure force shall be applied in the opposite direction to the said movement: in order to equilibrate the system and obtain a stable flight, the aircraft is further provided with stabilizing means able to oppose destabilizing forces, in case it is needed. As such, every aircraft generally comprises a body or fuselage where the pilot, passengers and/or goods can be arranged, a lifting surface which allows the aircraft to be on the air without falling, a stabilizing surface allowing the aircraft to be stable on its trajectory and a control surface, allowing directing the aircraft. These aircraft parts can be mobile or fixed and can either be made coincident or be independent. Often, lift surfaces are joined to the fuselage, also working as stabilizing surfaces; stabilizing and control surfaces are arranged distances from the centre of gravity, typically on the aircraft's tail.

Departing from the previous considerations, there are mainly two ways of obtaining lift, stability, control and propulsion in an aircraft: by means of passive surfaces, where the force is obtained by the aircraft's velocity, or by means of active surfaces, which move and force the air in the opposite direction as the resulting forces that need to be overcome. The above will provide the different classification of aircraft, as it will be further explained.

In passive fixed surfaces, propulsion is not known. Gliders may be cited here, converting potential energy into kinetic energy, therefore taking advantage of the higher velocity of the air in their wings for producing lift when they glide from a certain height. In passive rotative surfaces, similarly, even when it is not known any passive rotor providing propulsion, potential energy obtained at a certain height can be transformed into kinetics energy by increasing the rotational speed of the blades during the descent gliding to generate the appropriate lift.

In active rotative surfaces, propulsion is obtained by rotors, blades or turbines. In these, control surfaces are used to obtain a certain trajectory of the aircraft. It is known in the state of the art that every rotating object has gyroscopic properties and tends to maintain a certain trajectory, opposing with resistance to a modification of it. In these active rotative surfaces, propulsion is obtained by blades or by any motorized means providing a higher propulsion than the weight of the aircraft. Rotating blades used for example in helicopters made the air to be driven in order to overcome the forces opposed to the forward displacement of the aircraft and to its elevation. Other active surfaces are known in the state of the art, such as flapping wings.

In the aircraft known in the state of the art, there are problems associated to stability, different depending on the type of aircraft, for the above-mentioned types of surfaces, as it will be explained here after.

When talking of fixed passive surfaces, there are those aircraft having wings and also those where the wings and the fuselage are in the same surface: these surfaces present stability problems; the surfaces with wings have been particularly designed for being more stable though the aircraft is less efficient. In the specific case of flying wings, lift, stability and control are provided by the same passive surface. Several examples of fixed wings with the same of a disc are known in the state of the art: these surfaces have the advantage of lodging the minimum surface with the maximum aerodynamic efficiency. However, the problem of these surfaces is the low stability, as the centre of pressure originates a rapid tilting moment when the angle of attack increases, something that has not been effectively overcome up to now.

Some other examples of known rotative passive surfaces (using blades, such as a gyroplane) or rotative active surfaces (helicopters, for example) or even swing active surfaces (such as ornithopters) present similar stability problems.

Document U.S. Pat. No. 1,753,112 is known in the state of the art, disclosing an airplane provided with lifting means operating independently of lifting provided through normal wing surface of the airplane. Document U.S. Pat. No. 2,402,957 discloses, for example, an airplane developing power as it moves through the air, and it is also known from U.S. Pat. No. 2,529,033 a helicopter with an improved multi-rotor. Other aircraft are known from documents such as U.S. Pat. Nos. 2,711,295 or 3,103,324. Document U.S. Pat. No. 3,104,853 shows an airplane for vertical take-off and landing. Gyroscopically stabilized aircraft are known in U.S. Pat. No. 3,946,970 or in U.S. Pat. No. 3,946,970, for example, or autogyro aircraft is known as per U.S. Pat. No. 4,913,376. A lifting aircraft as helicopter is disclosed in U.S. Pat. No. 5,240,204, for example. Many other documents in the prior art can be cited as examples: U.S. Pat. No. 5,503,351 (circular wing aircraft in the form of a helicopter with a circular wing assembly), U.S. Pat. No. 6,062,508 (compound aircraft with a lift rotor assembly), U.S. Pat. No. 6,450,446 (disc shaped wing for an aircraft), US 2004/0113013 A1 (disclosing a rotor system allowing an aircraft to operate as a helicopter or as an airplane), amongst others, all presenting stability problems as it has been already described.

Also known in the state of the art are flying wings having a disc shape, as described in U.S. Pat. No. 5,727,754 A comprising a mast with a tiltable spindle (not shown) extending upwardly from a forward portion behind the cockpit: the spindle of mast supports a high inertia rotor for rotation about the mast. The spindle of mast allows the rotor to tilt relative to the fuselage forward and rearward and side to side while rotating.

In the state of art, if the wings do not rotate, the drag of the rotor blades increases with the third power of the speed and the regressing blade does not allow to overcome the barrier of sound. In the device of the invention, at high speeds the disc has the blades closed hermetically, thus constituting a continuous surface which does not have the problems of paddling the blades of the rotors of the autogyro or helicopter. In the state of the art, as per U.S. Pat. No. 5,727,754 A discussed above, it is essential that the blades have the highest moment of inertia possible, and so they are rotated first with the lowest possible angle of attack, in order to obtain when opening the angle of attack the greatest possible vertical impulse. In the device of the invention, the disk rotates first tightly closed; its mass is greater than that of any blade of helicopter or autogyro, and consequently its moment of inertia, so it would act as a flywheel of inertia, storing kinetic energy that later, at the time of opening the blades, would generate more lift. Also, while the blades are closed the disc is a continuous surface and its geometry has no problems with shock waves, since said waves are always arranged in a direction perpendicular to the trajectory of incidence, so that they would never meet with the circular alar surface.

In the state-of-the-art the autogyro is also known with a rotor in the shape of a disk and outer blades from U.S. Pat. No. 4,195,800, in which an autogyro with a rotor consists of blades radiating outwards from a central disk structure. This causes the same problem with shock waves as in the previous patent as the blades rotate outside the disk, in contrast to the apparatus of the invention in which the blades are distributed internally on the wing surface in the form of a circular crown and can be closed hermetically. The autogyro disclosed in U.S. Pat. No. 4,195,800 has a lower degree of freedom as to the rotor than that of the apparatus of the present invention, and does not allow the disk to roll. Moreover, the shape of the disk is discontinuous as it has at least one ring outside the disk to avoid stalling; it allows the circulation of air through fixed gaps without it being possible to regulate their opening or closing (these gaps are referred in the disclosure as flaps and slots)

CN 107380428-A discloses a rotor craft type disk that allows pitching. Rolling is achieved by means of mobile surfaces inside the disk known as rudders, provided that they are open. As already discussed above in relation to U.S. Pat. No. 5,727,754 A, at high speed there will be problems with shock waves when the blades are open. Besides, in order to make coordinated turns the propellers and the tail duct must be used, which is in contrast to the apparatus of the invention as the latter is a rotating flying wing and is configured to modify the nautical angles (yaw, pitch and/or roll) of the apparatus (100) during the flight, orienting it in the desired directions and allowing by itself effective and full maneuverability of the apparatus (100) during the flight. It is precisely the ability to make coordinated turns without the need for blades, which the apparatus of the invention is able to do as a rotating flying wing, which makes it more efficient and maneuverable than the state-of-the-art cited references.

Finally, in the state-of-the-art aerodynamic decelerators are generally referred to as "pararotors" and are used to brake aircrafts as they descend in any kind of atmosphere and to stabilise their trajectories. They are also used to recover elements from space, to locate the trajectories of projectiles, as weather balloons, for taking environmental measurements, to control the entry of manned or unmanned vehicles into a certain atmosphere, or the guiding of aerodynamic devices in flight, among others. The pararotor is an aerodynamic decelerating device based on the autorotation of rotating wings. Autorotation is the continuous rotation of a body immersed in axial fluid without any other external sources of energy apart from the action of the current of fluid and gravity. When the body is displaced in a fluid the blades rotate and as a consequence of this movement aerodynamic forces are generated that act in opposition to their main movement of passage. Their performance and practical use is subordinated to knowledge of their flight dynamics on the basis of the aerodynamic and geometric parameters of the device. The autogyro was invented as an aircraft which in the event of the engine stopping operates as a pararotor and its principle of operation in flight is based on this phenomenon of rotation by driving air over the blades. The helicopter was a development of the autogyro in that the driving of this pararotor system of blades by means of a propellant allowed the appliance to rise and move through the air. In the apparatus of the present invention a new pararotor system has been designed that consists of a set of plenums of pressurised air (ram-air) which are in themselves a development of the helicopter, as the disk containing them is rotated by means of a propellant and when the blades inside it open, they push the air more efficiently and allow the aircraft to rise.

The aim of the present invention is to provide a novel and inventive type of aircraft having self-identity. In the aircraft of the invention, active gyroscopic rotation is used as passive lift surface. Even when this characteristic of the invention helps making the aircraft more efficient, it does not allow the elevation of the craft by itself, as an air flow is needed for this: this fact differentiates the aircraft of the invention with respect to the helicopter, for example, where the active rotation propels the air and the apparatus therefore moves in opposite direction to this propulsion, or with respect to the gyroplane, where the blades rotate by the action of the air, which produces lift. The aircraft of the invention therefore provides a very efficient and further orientable lift surface, compared to those known in the state of the art. The invention also aims at other objects and particularly at the solution of other problems as will appear in the rest of the present description.

SUMMARY OF THE INVENTION

According to a first aspect, the invention relates to a flying apparatus comprising a main structure of airframe or fuselage and a rotative wing surface, and the rotation of the rotative wing surface allows take-off, landing and displacement through the air of the flying apparatus. In the apparatus of the invention, the fuselage hangs from the rotative wing surface around a hanging point, allowing the rotative wing surface and the fuselage be moveable independently with respect to each other. The rotative wing surface is configured as a disc with a concave surface and comprises one or a plurality of orientable elements acting as command and control surfaces orienting the apparatus in desired directions. According to one embodiment of the invention, the wing surface is made part of the structure of the fuselage.

The flying apparatus of the invention is governed by the movement of the rotative wing surface and with the tail or the vectorial nozzles in the propulsion means, depending on the flying apparatus having a tail with propeller or not. The moveable or orientable surfaces are used for: braking or recovering energy and they also work as security valve (controlled by an actuator) through which air can go through in the case where the rotative wing surface is lifted by the action of a wind gust. The actuator is activated when a pressure sensor (set at a certain maximum pressure level) in case a pressure level is too high to be withstand by the rotative wing surface (if the apparatus is intended to brake or reduce speed, it will still be able to do that, but it will break less abruptly). In case there is a higher need of preserving the rotative wing surface without being damaged or broken, higher quantities or air are allowed to go through by opening more the distance left between the blades, acting as a regulator: the configuration acts as a rotating parachute and, even when the blades are more open and the apparatus will descend more rapidly, as it rotates, it will be braking little by little until it closes the distance between the blades gradually to brake more. This configuration prevents the abruptness of the parachute when they open, also acting as regenerative braking in the case where, taking advantage of the increase of rotation speed by effect of the air circulation, an energy recuperating device is activated. In the detailed description that follows, further explanation on the pararotor and on an improved pararotor with steerable system is presented.

Preferably, in the flying apparatus of the invention, the airframe or fuselage and the rotative wing surface are rotatable around any of three rotational axis X, Y and/or Z, independently to each other. Furthermore, in the flying apparatus of the invention, the degree of concavity of the rotative wing surface is preferably in inverse proportion of the speed of the apparatus.

Typically, the flying apparatus of the invention further comprises command and control surfaces, configured as orientable surfaces, arranged on the tail and/or on the wings of the said apparatus. According to a possible embodiment of the invention, the command and control surfaces and/or the movement of the rotative wing surface and/or the one or plurality of orientable elements and/or the fuselage is driven remotely.

The stabilizing surfaces in the apparatus of the invention are calculated in a conventional manner, according to the centre of gravity and the aerodynamic centre of the apparatus, in order it is in equilibrium. Typically, each aircraft manufacturer will calculate differently the location of these stabilizing surfaces, depending on the weight and geometry of the aircraft.

Preferably, in the flying apparatus according to the present invention, the rotative wing surface is actuated by propulsion means, and so is the case of the apparatus itself. This same propulsion means can be used to make the rotative wing surface rotate, to make the propellers or turbines, or for both, with the appropriate transmission means. It is also possible to have independent propulsion means, one for each purpose. These propulsion means can be one or more of the following: human propulsion, electrical motor fed by batteries, electrical motor fed by solar energy, combustion engine, orientable propellers, ducted fan with orientable vectorial nozzles or turbines with orientable vectorial nozzles. The propulsion means in the apparatus of the invention are also orientable, thus ensuring that, in case it is necessary, the possible pair (or torque) generated is corrected.

Furthermore, the flying apparatus of the invention typically further comprises energy recuperating means, allowing braking or lowering the rotational speed of the rotative wing surface. Preferably, the flying apparatus further comprises means for positioning the rotative wing surface (its orientable surfaces inside) with respect to the ground with the adequate angle of attack to obtain maximal vertical lift in order to allow vertical take-off and/or landing. According to another possible embodiment, the flying apparatus is further provided with further propulsion means for vertical take-off and/or landing arranged under the fuselage, coaxial or parallel to the vertical axis of the apparatus. According to another possible embodiment, the flying apparatus of the invention is provided with vectorial nozzles moveable and orientable to help the take-off and landing of the apparatus, by orienting the air downwards.

Preferably, in the flying apparatus of the invention, the rotative wing surface is configured to modify the nautical angles (yaw, pitch and/or roll) of the apparatus during the flight, as the rotative wing surface moves upwards and downwards and also to the sides. Typically, the airframe or fuselage overwraps at least partially a cell or nacelle of the flying apparatus, arranged inside the fuselage, and being pressurized.

Yet in another embodiment, the flying apparatus of the invention is configured as a bicycle, as a tricycle, as a quadricycle or as a quad, wherein the propulsion means actuating the rotative wing surface comprise human pedaling.

BRIEF DESCRIPTION OF THE DRAWINGS

Further features, advantages and objects of the present invention will become apparent for a skilled person when reading the following detailed description of non-limiting embodiments of the present invention, when taken in conjunction with the appended drawings, in which:

FIGS. 3a-d show command and control surfaces in the flying apparatus or aircraft according to the present invention.

FIG. 4 shows the orientable command and control surfaces in the flying apparatus or aircraft according to the present invention.

DETAILED DESCRIPTION OF EXEMPLARY EMBODIMENTS

Figure 1A:
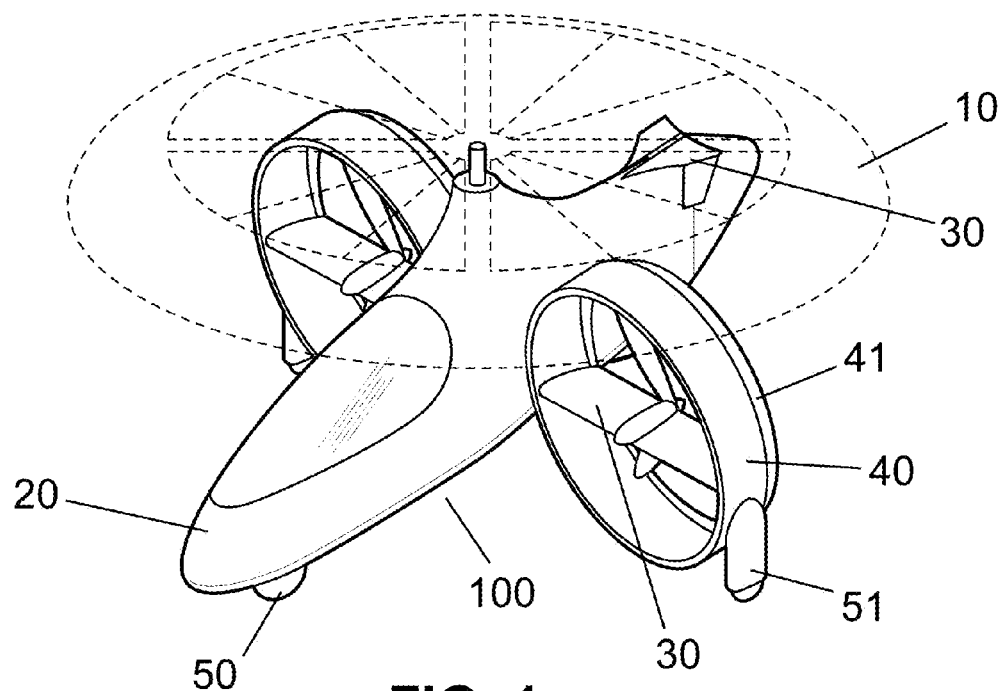
FIGS. 1a-b show schematically a possible configuration of the flying apparatus or aircraft according to an embodiment of the present invention; the wing profile is shown with dash lines, for better clarity.

Surfaces such as flying wings and Blended Wing Bodies (BWB) are known in the state of the art, being characterized by having passive lift surfaces (wings) that are the same (or partially the same) as the fuselage and the stability and control surfaces; furthermore, propulsion means are also provided in the said surfaces. The invention is however characterized by being a rotating flying wing, meaning that it comprises rotative active lift surfaces; however, these surfaces are made to work in a passive way and they also comprise inside the fuselage, the surfaces being by themselves also stability and control surfaces. Compared to helicopters, for example, these surfaces are not propulsion means, that is, the rotation of the lift surface is used for the optimization of the lift of the apparatus, but this lift is obtained by the propulsion coming from the propulsion systems, which make the aircraft advance and increase the flow speed. In the state of the art, no such surfaces having these characteristics (stability advantages provided by the gyroscopic rotation, possibility of being oriented and further with the advantages of geometry optimization, weight and surface of a flying wing) are known. The aircraft of the invention could be classified as a novel and inventive aircraft, different to known rotating or gyroscopic flying wings in the state of the art.

A particular case of flying wings is that of wings having a disc shape. This aircraft also comprises flying wings, as it is the case of the helicopter or the autogyro. However, contrary to these aircraft, the disc-shaped flying wings comprise a disc in the rotor, instead of having blades; this disc is also a flying wing and is moved by a motor system. In order to have these aircraft move within the air, a powerplant providing the translational movement is needed, as it is the case for a standard aircraft (fixed wing). This type of aircraft takes advantage of the kinetics energy provided by the rotation of the disc for making the flight more efficient. In this type of aircraft, lift is provided by the profile of wing-fuselage, which is not fixed, and can rotate (it can roll, pitch or yaw) in order to stabilize the aircraft. In this aircraft, taking-off and landing can be done vertically, by using in the rotor a system comprising blades coaxial to the rotative wing, called pararotor, which helps lift of the aircraft when flying in a fixed point or in vertical; however, this pararotor is folded under the fuselage when flying and displacing horizontally at high speed. The system of the invention works making the disc rotate with the blades closed, until a rotational speed is attained with a sufficient inertia moment to allow the aircraft take-off: in that moment, the blades are opened with the appropriate angle to provide the maximum power and lift. Once the aircraft is on air, the horizontal propulsion means are activated in order to speed up. The angle of attack of the rotative flying wing is zero but, thanks to its curvature and properties, produces lift while advancing, which allows closing the distance between the blades of the pararotor to replace the lift of the blades by the lift of the flying wing. It is important to effect this manoeuvre in this order when the rotor traction is mechanic, in order to avoid eventual incidences by gyroscopic par; it is however not the case when the rotor traction is by reaction (tip jet or jet pack).

Figure 9A:
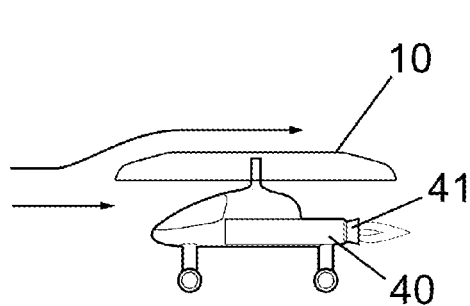
FIGS. 9a-g show the orientation and/or blades aperture of a flying wing surface in the flying apparatus or aircraft according to the present invention, according to different flying conditions.
Figure 9B:
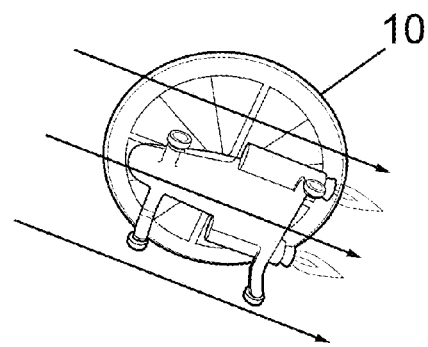
Figure 9C:
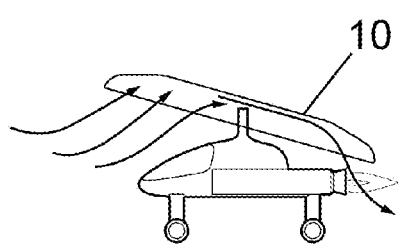
Figure 9D:
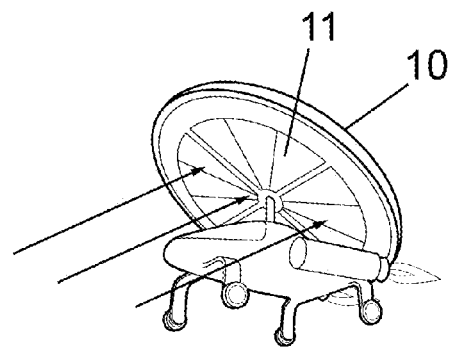
Figure 9E:
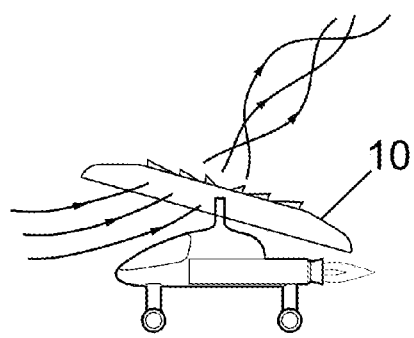
Figure 9F:
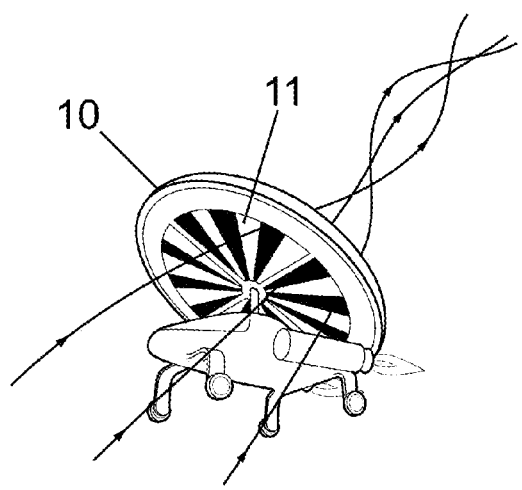
Figure 9G:
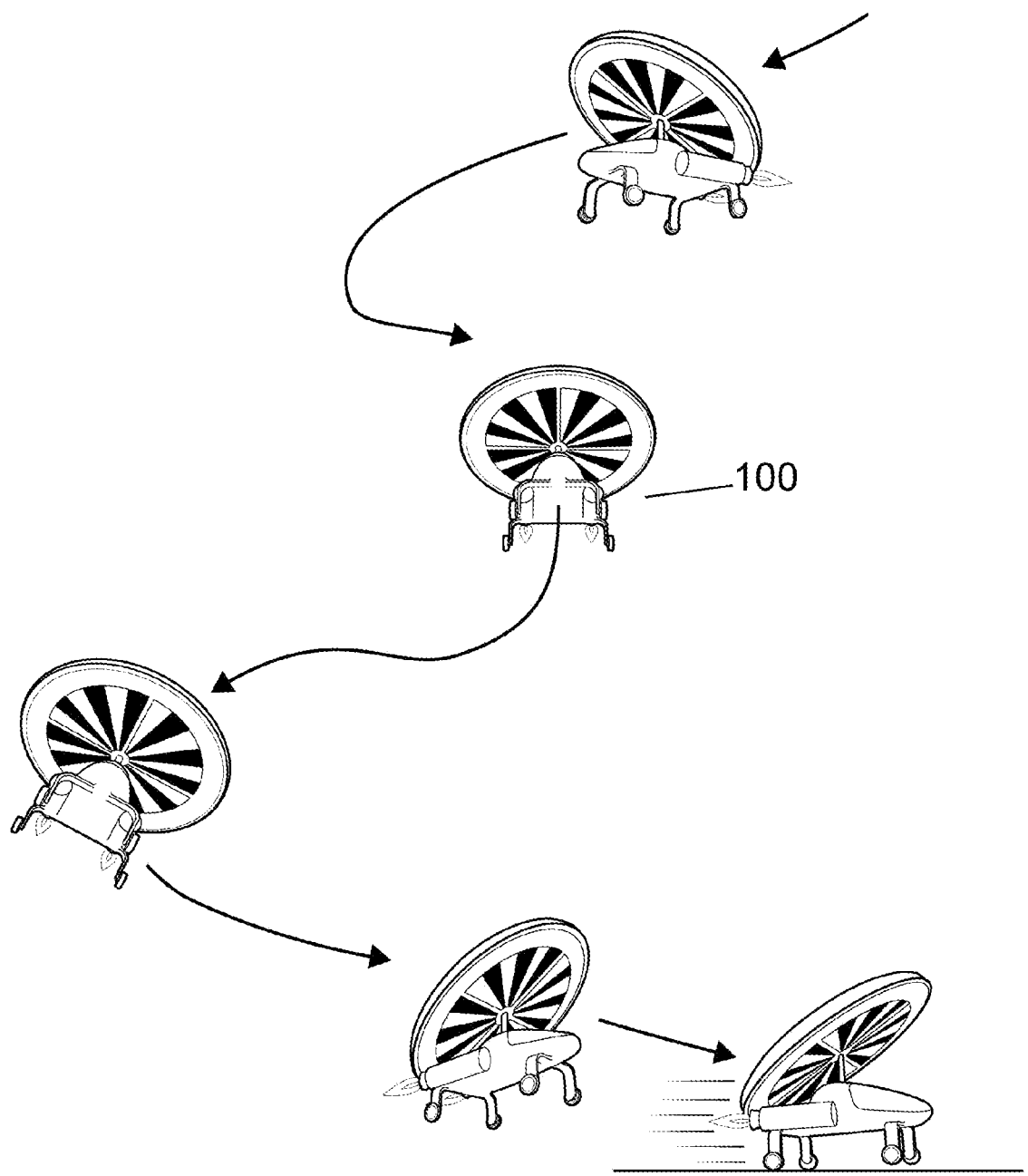
Figure 10A:
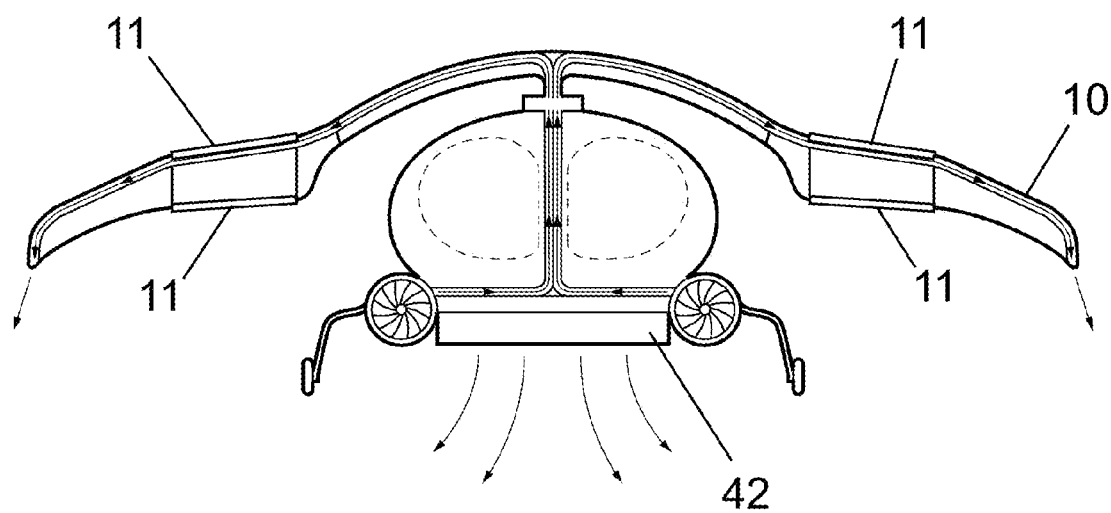
FIGS. 10a-d show the behaviour of the pararotor system in the aircraft or flying apparatus according to the invention when used for vertical take-off.
Figure 10B:
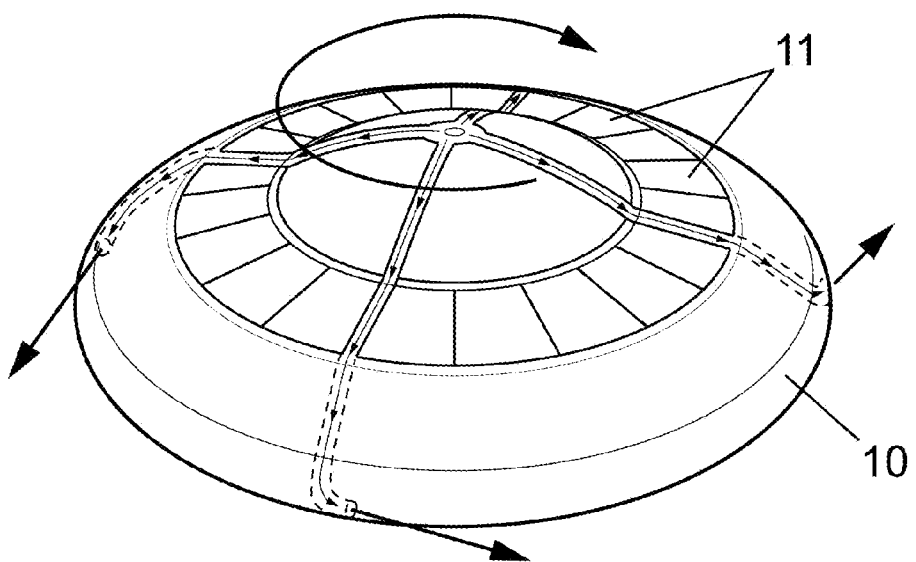
Figure 10C:
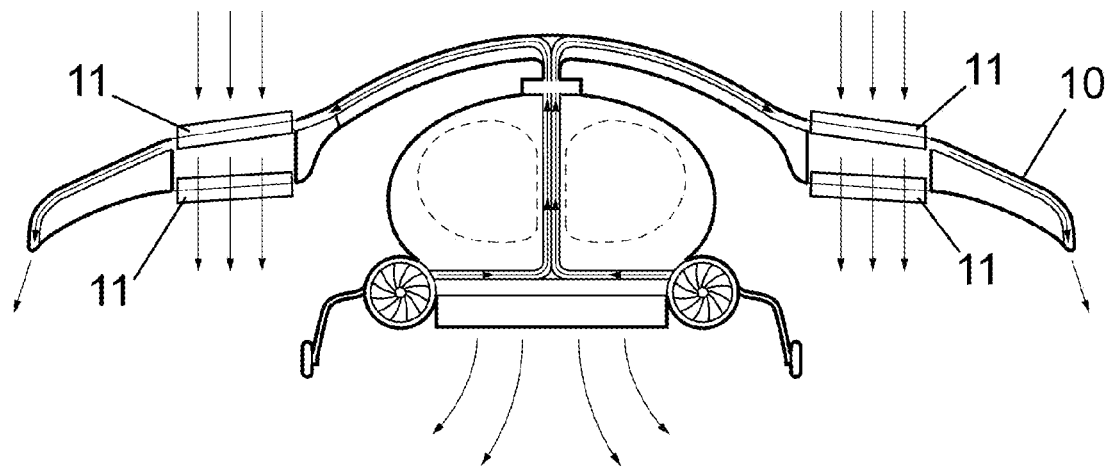
Figure 10D:
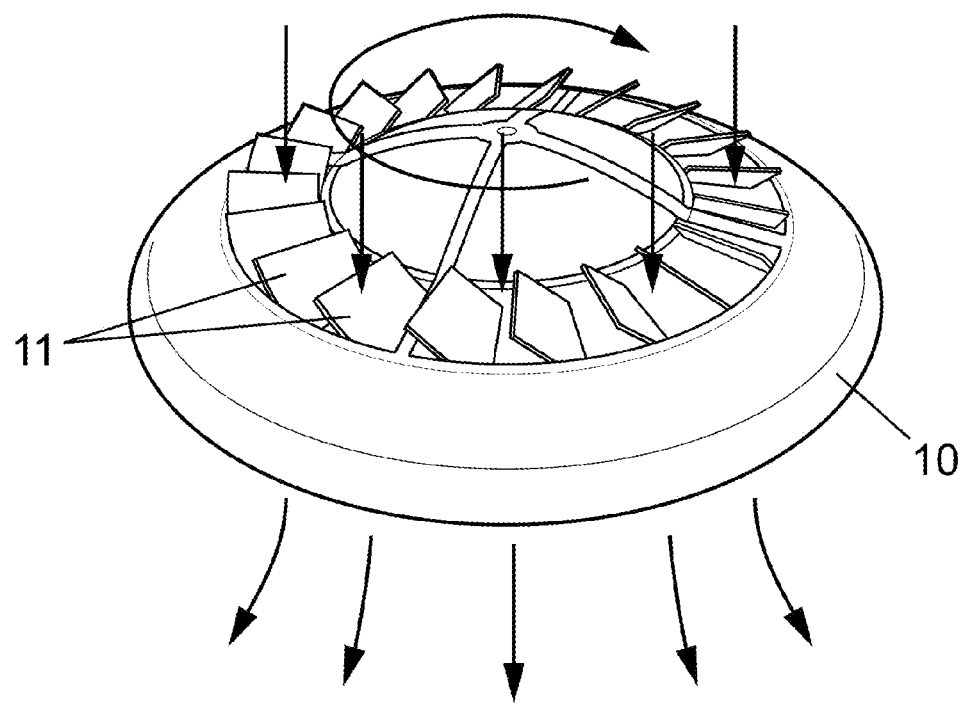
Figure 10E:
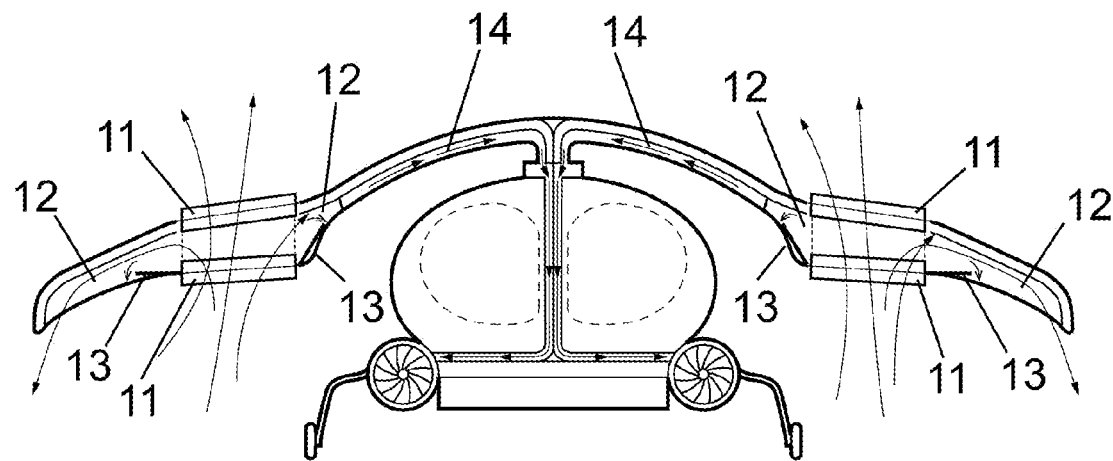
FIG. 10e shows the behaviour of the pararotor "Ram-air" in the aircraft or flying apparatus according to the invention combined with the pararotor of braking blades.
Figure 10F:
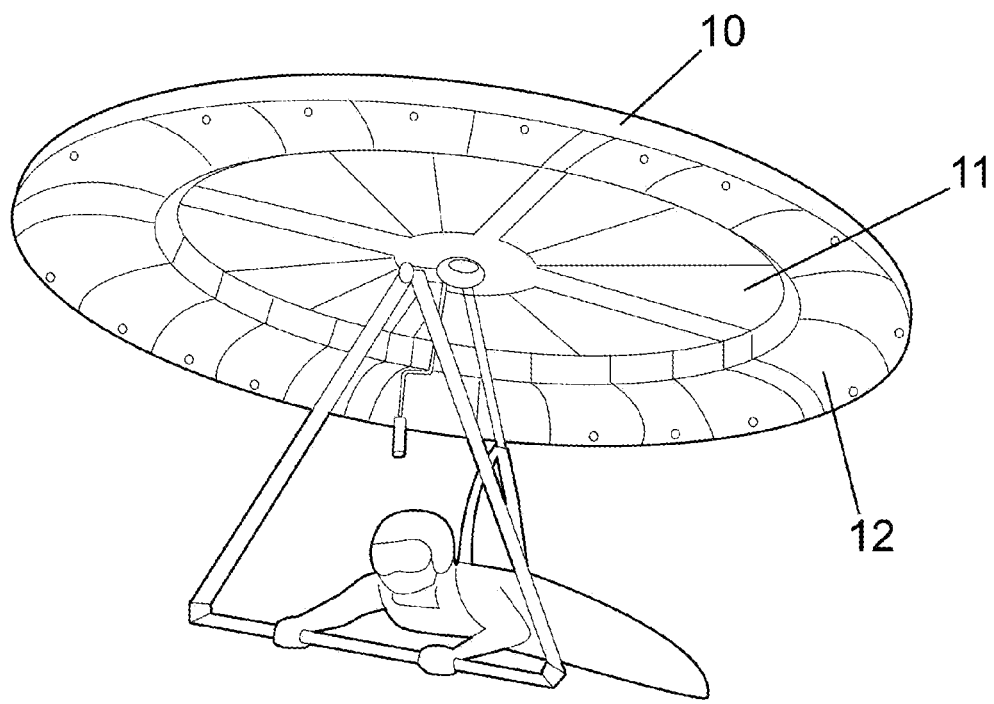
FIG. 10f shows an example of application of a pararotor "Ram-air" in the aircraft of flying apparatus according to the invention, for flying wings apt for free flight.

Making a further explanation on this pararotor system, the pararotor can be broadly defined as a braking system using the orientable blades or other surfaces in the flying wing surface 10, which can further actuate an energy recovering electrical system. This system can be used as such in any of the types of different flying apparatuses covered by the present invention, but it can be further improved when it is of the jet type and comprises orientable vectorial nozzles or ducted fan (to where air is conducted). An explanation can be following when looking at FIGS. 9a-g where a pararotor system as the one used in the invention is shown. FIGS. 9a-b show a stable and levelled flight of an apparatus, where the flying wing surface 10 rotates and the blades are closed: this represents a stable flight. Looking at FIGS. 9c-d, the angle of attack increases excessively and, as the blades are closed, no air is allowed to go through, so the pressure increases also excessively. Therefore, to overcome this increase of pressure, the blades of the flying wing surface 10 open so they let the air go through, alleviating the pressure; at the same time, the wing surface 10 rotates more quickly (see FIGS. 9e-f). This allows the pilot to brake gently and to orientate correctly the apparatus until complete landing and braking (see FIG. 9g).

The aircraft disclosed in the present invention presents several differences with respect to other known aircraft, as it will be presented now:

With the gyroplane: the blades in the gyroplane do not rotate connected to any motor, but rotate by the action of the flow of air.

With the helicopter: this aircraft uses the blades, which are actioned by the rotor, for displacing; however, there is still a problem to be solved in helicopters, and this is the speed rotation limit imposed by the sound speed, this problem also limiting the translational speed, as already disclosed earlier. This could be solved by manufacturing a blade having a supersonic profile, which is something complicated and not yet commercially used.

With the convertible: this aircraft comprises blades and is not a flying wing.

With respect to any aircraft having rotative wings: in the flying wings (as it is the denomination of the aircraft of the invention) the wing profile is a blade, whereas in an aircraft the wing profile is the whole wing fuselage.

With respect to a fixed flying wing: in a conventional known flying wing, the wing does not rotate, bigger size is needed than in the case of the invention and its centre of gravity is determined by the geometry of the whole wing.

With respect to a flying disc wing known in the art: (e.g. the flying disc of Moller) it does not rotate and is instable and, moreover, no known system takes advantage of the extra kinetics energy provided by the rotation of the disc to generate lift in the horizontal wing, and also taking advantage of the gyroscopic properties of a rotative disc to maintain stability, as it is the case in the aircraft of the invention. The flying disc of Moller, known in the art, does not rotate: what rotates are four ducted fans or impellers arranged inside of it, driving the air downwards. As the disc does not rotate, it does not have gyroscopic properties, being very unstable. Differently, the apparatus of the invention rotates, and this rotation ensures stability by the gyroscopic properties of the rotating bodies, by means of which they can keep their trajectories.

The flying surface or aircraft in the present invention needs the rotation of the flying wing in order to be stable and to take advantage of the aerodynamic advantages provided by the displacement of a mass of air which is much higher (in efficiency terms, i.e. with the minimum possible work) than that in any other known aircraft or flying surface.

In summary, there are many others known fixed flying wings in the state of the art and many aircraft having rotative wings, but in none of these, their fuselage (or their wings) is a rotating or rotative and orientable or steerable flying wing, as it is the case of the present invention.

The aircraft according to the present invention can be configured differently, with different motor configurations, as it relates to a new flying technology, which therefore allows the development of any size of aircraft and further allows a wide range of passengers' capacity. The aim of the aircraft of the invention is to develop an aircraft that is universal, easy, secure and able to operate from any site, without the need of using big aerodromes.

Some of the advantages of the aircraft of the invention are the following:

Aerodynamic advantages: as the aerodynamic resistance to a fixed wing, for the same lifting surface, is lower. The flying apparatus of the invention is configured differently but always aiming at obtaining the aerodynamic surface with the lowest wingspan and the highest efficiency.

Costs: similar to those of an equivalent airplane but lower to those of the helicopter thanks to its higher simplicity.

Security: equivalent to a gyroplane as its lower rotor is auto-rotative and, similar to the airplane, is a stable aircraft.

The take-off and landing can be done vertically (VTOL) or almost vertically, with a very short take-off (VS-TOL), depending on the configuration: electrical is VSTOL, jet is VTOL; the dependency with the ground is minimum, contrary to an airplane.

The interval of speeds is similar at lower speed to that of the helicopter and at high speed is similar to that of the airplane. Also, the aircraft of the invention can fly at supersonic speeds, contrary to the helicopter or to other aircraft having rotating wings in the state of the art.

It is more silent than the helicopter and the gyroplane as it does not have any flapping blades. Also, the rotation of the lift gyroscopic surface can be actuated by means of electrical propulsion systems, much more silent than the motors of the helicopter, as the rotation is used for lifting and not for propulsion, as it is the case in the helicopter. For example, in the Tip Jet, the disc rotates thanks to the gases coming from the turbines and only in the vertical take-off phase the noise is high (during the flight, the rotating speed is lower and therefore, more silent; the blades are usually closed during the horizontal flight).

Versatility: the aircraft of the invention can be actioned by human propulsion (for example by pedaling a bicycle), by electrical motors fed by batteries or by photovoltaic cells of solar energy, by combustion engines and propellers in ducted fan or by turbines, that can be configured having a single place or a plurality of places, as desired.

Higher structural resistance with the minimum surface, thanks to the disc shape, as the fuselage and the wing are integrated.

Higher stability and control: the rotation of the disc provides a very high stability, as all the fuselage benefits from the gyroscopic properties (gyroscopic stiffness and gyroscopic precession). The pararotor overcomes the gyroscopic moment, so no tail rotor is needed, and the tilting moment is absorbed by the joints of the rotors. In case of moments appearing due to the action of the rotor, it should be noted that these moments are very low and can be absorbed by the proper action of the vectorial nozzles.

In the case of a passengers' aircraft, the disadvantages associated to high angles of attack and high inclinations on the turns are avoided, as it happens in the state of the art with flying wings or BWB, as the cabin can stay completely horizontal while the apparatus manoeuvres to orientate the flying wing.

The main parts or elements in the aircraft of the invention will be now described in more detail, as it follows.

Figure 1B:
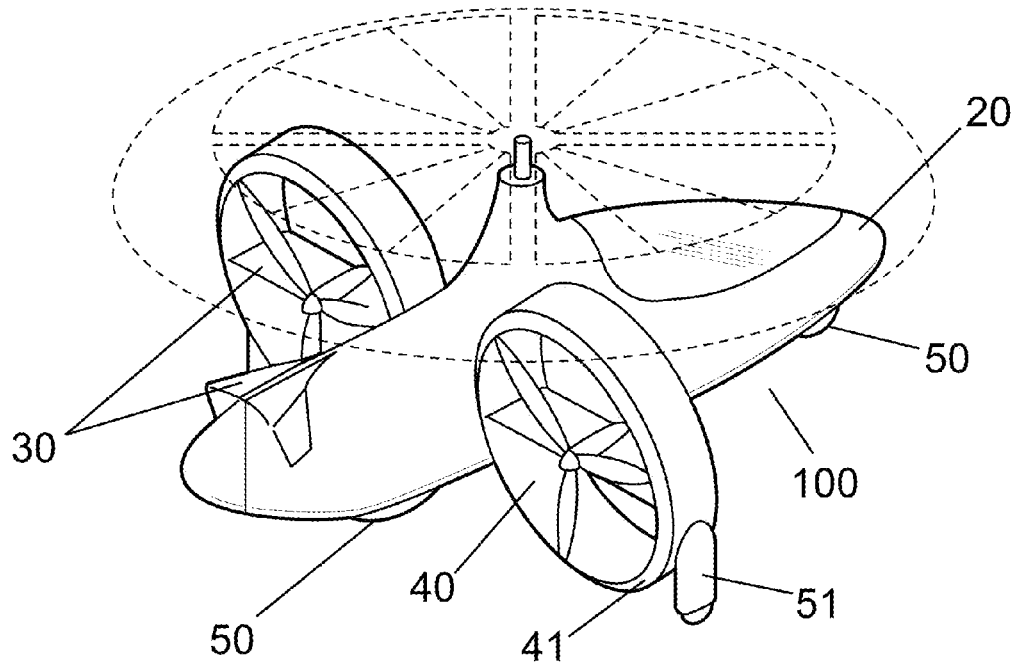
Figure 2A:
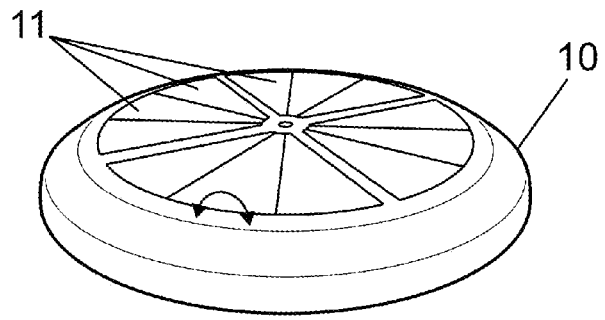
FIGS. 2a-d show the configuration of a flying wing surface in the flying apparatus or aircraft according to the present invention: the profile is shown with several curvatures, for normal configuration (FIGS. 2a-c) and over-wrapped configuration (FIG. 2d).
Figure 2B:
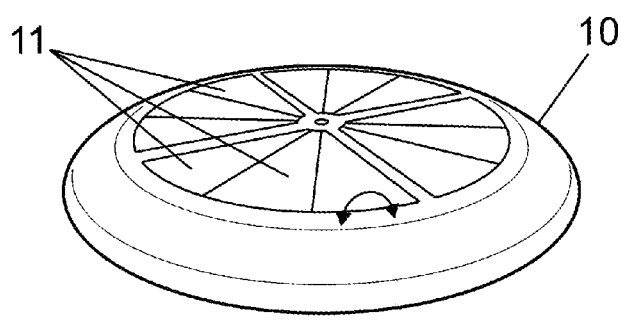
Figure 2C:
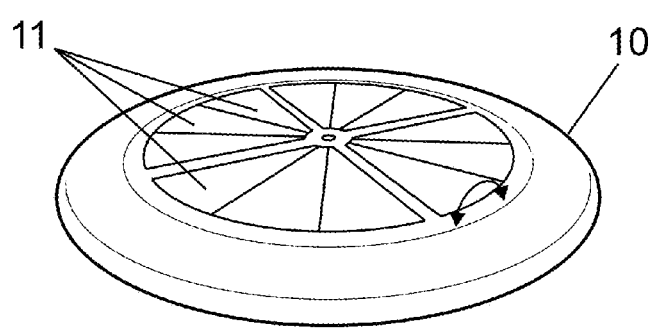
Figure 2D:
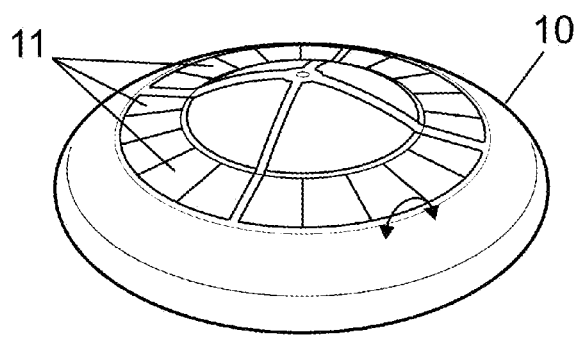

As schematically represented in FIGS. 1a and 1b, a possible embodiment of the aircraft of the invention is shown here. The aircraft or flying apparatus 100 comprises a rotative wing surface 10, which is part of the airframe or fuselage 20, and a heading control system (command and control surfaces 30). Also, the aircraft or flying apparatus 100 comprises a landing gear 50, a propulsion system 40 and other auxiliary systems as it will be explained in what follows. The aircraft of the invention is a tilting or swinging aircraft where the airframe or fuselage 20 hangs from the wing surface and can rotate or swing around the hanging point. The airframe or fuselage (20) and the rotative wing surface (10) are operatively connected. This is why the configuration of the aircraft of the invention allows the movement of the plane of the wing surface independently from the fuselage or airframe. The apparatus propulsion system is orientable 41 and also serves as a control system for the torque or anti par, in the case of mechanical traction of the rotor. Besides, the aircraft of the invention is easily scalable, from an ultralight aircraft to a passenger's aircraft.

As shown in FIG. 2, the flying wing surface 10 is the most important element in the aircraft or flying apparatus 100 of the invention. It is shaped as a disc, having a concave surface: the slower the aircraft is, the deeper the concavity is designed, as the lift characteristic is associated with this flying surface (FIGS. 2a-b-c). The flying wing surface 10 comprises mobile orientable elements 11 which can be oriented and act as security and secondary command and control surfaces. The design of this surface 10 is optimised in order to provide optimal efficiency with the best speed and longer distance travelled with the lower fuel. Rotation of the flying wing surface 10 is obtained by a power source, driving the said wing surface 10 by means of transmission means or by means of gas discharge. This is known as Tip Jet: typically, these apparatuses are configured as helicopters having inside of their blades a conduit ending in a nozzle through where the gas from the turbines is expelled, making the blades turn (in the known Tip Jet configured helicopters, there is no need to provide a tail rotor). This type of Tip Jet system is known in the state of the art and is at present known and used in reaction helicopters: however, it is limited due to the fact that the blades cannot rotate too fast as there would be problems originated by the shock waves. In the apparatus of the invention, however, this problem is removed as the rotating element is not configured as a blade but as a continuous disc, and there is no trailing edge of the shock wave that can originate cavitation.

Looking at FIGS. 3a-d the different command and control surfaces 10 and 30 in the aircraft or flying apparatus 100 of the invention are shown: the wing 10 itself is the most important command and control surface, orienting its inclination upwards, downwards and to the sides. These surfaces 30 are rotative and/or orientable and/or moveable surfaces arranged on the flying surfaces, on the airframe or fuselage 20 or on the tail of the aircraft: they are driven by the control means on the cabin of the aircraft and originate different orientations or headings of the aircraft 100 according to these, in any of their axis (transversal, longitudinal, vertical). The additional orientable elements 11 in the flying wing surface 10 are also command, control and security surfaces of the aircraft, as represented in FIG. 4 (these surfaces are typically called pararotor). The aircraft of the invention can have or not a tail: in case of having a tail, this can be of many types, "T" shape, "V" shape, etc., as in any conventional aircraft, depending on the general stability requirements of the apparatus.

According to a possible embodiment of the invention, the aircraft can be configured as a gyroscopic apparatus rotating in any of three different rotational axis. In this embodiment, the aircraft comprises a rotor or rotating fuselage overwrapping all or part of the apparatus: it can rotate as a gyroscope in any of the three rotational axis of the aircraft. The aircraft comprises a rotor system driving the rotation of this rotor in at least one of the three rotational axis, comprising a mechanism allowing that the rotation takes place in the desired plane. The rotor of the aircraft of the invention is driven by a propulsion system (energy generating means), which can be an electrical motor or human means (pedaling for example). Furthermore, energy recuperating means are also provided, allowing braking or lowering the rotational speed of the rotor, if desired (the mechanical energy of braking is transformed into electrical energy and is stored in batteries.

Figure 5A:
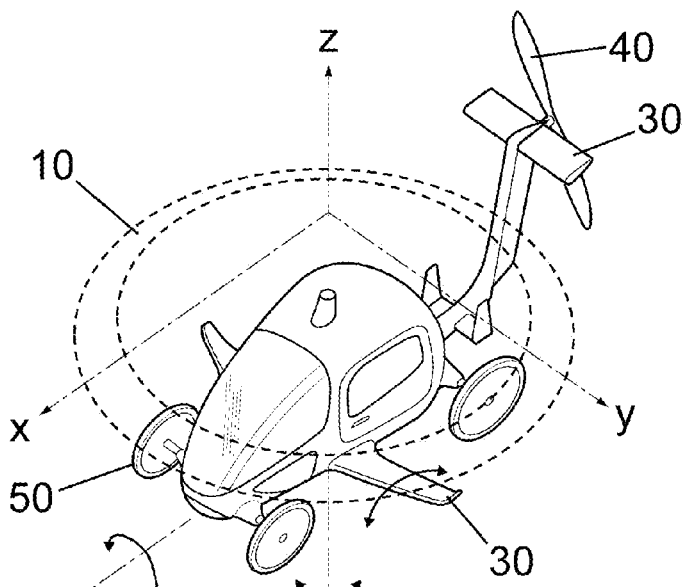
FIGS. 5a-g show different possible rotations in roll, pitch and yaw of the flying apparatus or aircraft according to the present invention.
Figure 5B:
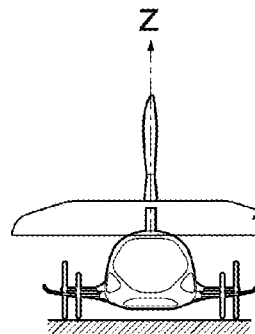
Figure 5D:
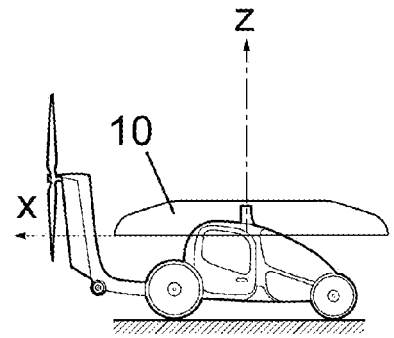
Figure 5F:
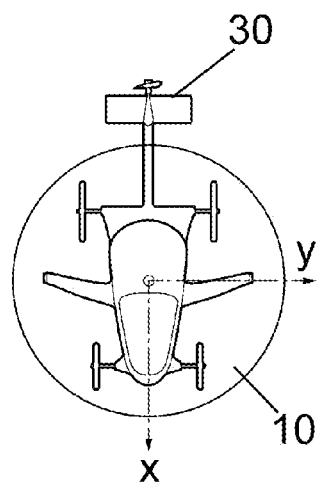
Figure 5C:
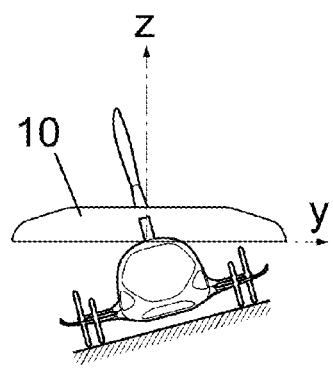
Figure 5E:
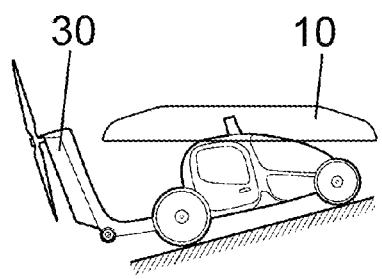
Figure 5G:
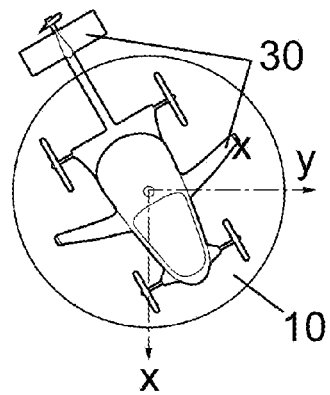
Figure 5H:
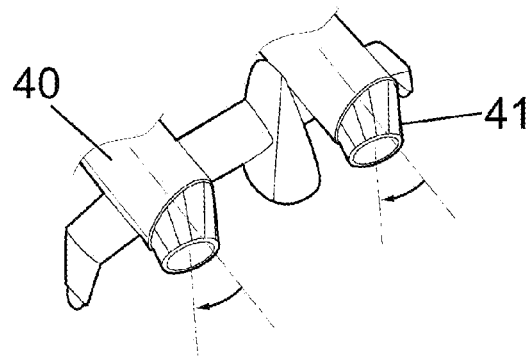
FIGS. 5h-m show the different possible configurations of the vectorial nozzles in the flying apparatus or aircraft according to the present invention.
Figure 5I:
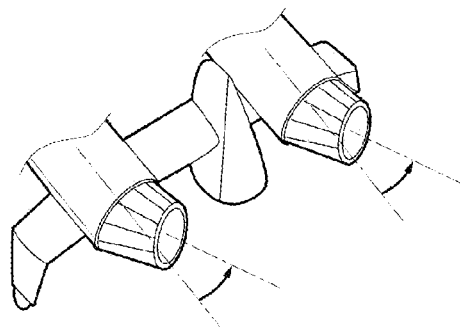
Figure 5J:
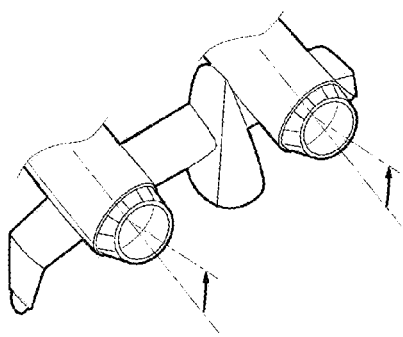
Figure 5K:
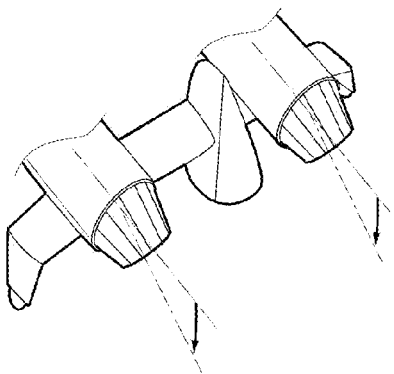
Figure 5L:
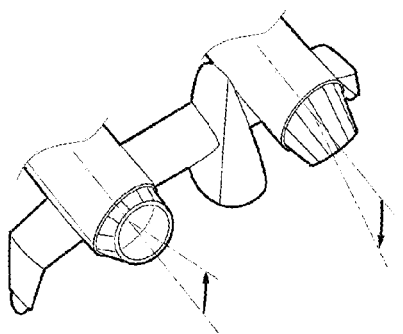
Figure 5M:
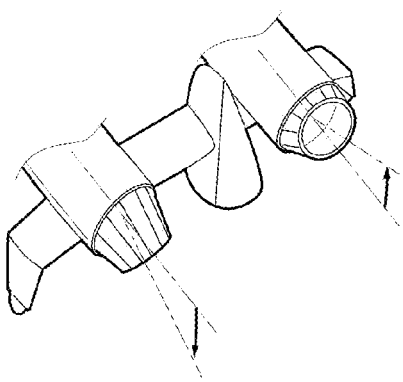

When looking at FIGS. 5a-g, when the rotative wing surface rotates around its symmetry axis, as there exists no other net gravitational momentum with respect to its center of mass, the angular moment is maintained constant. That is, the rotational axis (axis Z as shown in the FIGS. 5a-g) maintains a constant direction in space. Therefore, the rotative wing can be used as directional stabilizer as it provides a referential direction independent to the aircraft or vehicle. Rotational axis presents a very high stability which is proved by checking that the direction of movement of the aircraft is not sensibly modified when the fuselage moves around any of the perpendicular axis to the rotational axis or when the fuselage rotates around the said axis Z. The roll rotation of the aircraft of the invention is schematically shown in FIGS. 5b-c, in pitch in FIGS. 5d-e and in yaw in FIGS. 5f-g.

Similar to what happens in airplanes, the aircraft of the invention is further provided with a heading control system that allows the orientation of the aircraft in the desired direction. This system works as horizontal and vertical stabilizer as it directs the air flow accordingly and provides similar effects as those of the elevators and the rudders.

In the flying apparatus of the invention, the control is obtained in the following way, as it will be now described. Firstly, the wing or disc can move in any direction (see FIGS. 3a-d and FIGS. 5a-g) and the main manoeuvres of the Gyrobike are made through the disc (the disc moves to the right or to the left for rotating, and moves upwards or downwards to rise or to go down, respectively). Coordinated rotation is made using further the rudder (propeller) or orienting the vectorial nozzle. The vectorial nozzle is very versatile and it can be used for the roll, the yaw or the pitch. Also, the rear propeller can be orientable: this is important in cases where there exists gyroscopic torque due to the traction.

The aircraft according to the invention comprises a cell or nacelle fixed, overwrapped either totally or at least partially, by the rotating fuselage: the nacelle or cell can be completely pressurized and it comprises: a control cabin, a passenger's cabin and, optionally, a cargo hold. A pilot or remote control means will be located in the control cabin. Typically, a pilot will drive the aircraft from the mentioned control cabin though, according to a preferred embodiment of the invention, the control cabin can be made into a reception and driving system.

A drive or power system (the propulsion can be made by humans or it can be electrical, by gas, fuel, hydrogen, etc.) is coupled to the cabin's structure by mechanical means and the air flow is directed by an orientable vectorial system (or heading control system) working as horizontal and vertical stabilizer as it directs the air flow accordingly and provides similar effects as those of the elevators and the rudders. It is also possible to combine in the flying apparatus of the invention both types of control, elevators and rudders and also a drive or power system with an orientable vectorial system: both systems are complementary and compatible. Vectorial nozzles are used at the same time the motor does.

The aircraft of the invention also comprises a landing gear 50, allowing the apparatus to move on the ground, water or snow. This landing gear further comprises a braking system. Energy or fuel storing means are also provided, except for the case when the aircraft is only actioned by human power. Mixed powered is also possible, both by electrical motor and human power, an inertia flywheel or human means. The landing gear can also be made retractable. Furthermore, the landing gear can also be provided with stabilizing wheels 51, particularly useful when there are only two main wheels, as in the case of the human powered aircraft.

The aircraft is further provided with a security system in case of loss of lift or speed when the propulsion system stops. This security system is called pararotor (orientable blades used to recover and direct the air and to manoeuvre the vectorial nozzles to direct the aircraft without the need of the motor) and it comprises at least a system of plenum or air-box arranged on the fuselage (or airframe) driven by at least one cam actuated from the control cabin. A pilot in the control cabin can actuate this security system, though it can also be actuated automatically and remotely. When the plenum or air-box are actuated, the flow of air is allowed to go through the fuselage and making it automatically rotate by the action of the speed given by the aircraft when falling, thus accelerating the air flow around it. A conduit is also provided, this conduit separating the flow of air into two flows, one directed to the plenum or air-box and the other one to the heading control system to allow stabilizing and orienting the aircraft (this would be the case of the orientable pararotor, as described earlier).

As an improvement in the different known types of Gyrobike, since the centre is physically occupied, either by the paddle-rotor system, or by the cabin (depending on the type of Gyrobike), the invention can complement it with the so-called orientable pararotor, (FIG. 10 e) allowing to collect and drive the aerodynamic flow to achieve two purposes: use static pressure to push the pararotor and spin the disc faster, improving stability, and also getting a lift force, because the air pressure acts as in a "ram-air" type glider (FIG. 10 f). Using the compressed flow collected in the pararotor to drive it, and taking advantage of the thrust that occurs as follows (depending on the type of aircraft): a) Driving it to a plenum to drive the propulsion of the rear propeller (if any); b) driving it up to a plenum to drive the propulsion of the propellers (ducted fan) or of the blades (turbines), and therefore sending the flow to the steerable nozzles, thus improving the maneuverability of the aircraft; c) driving it until an energy recovery system is activated.

The orientable pararotor system consists of a series of plenums 14 (or air-box) which collect the aerodynamic flow and take it inside the wing profile. This system is complementary or substitute to the blade system, and its opening 13 can be activated by the pilot, or automatically, analogously to the pararotor system of blades, when it descends in brake wheel mode or by failure of any of the propellers.

Therefore, according to the invention, there is provided a safety system for the loss of speed and lift due to, among other possibilities, the shutdown of the thrust system, which we shall call the Ram-air System, formed by at least one air-box 14 system coupled to the rotating fuselage, and operated by at least a cam from one (or several) control(s) in the cabin, (it can also be automatic) so that it opens the plenum or air-box 14 and allows the flow to pass through the wing fuselage, automatically rotating the fuselage by itself action of the speed that acquires the device in its fall and that accelerates the flow of air that runs through it, driving it. It also forms or can form part of the system a conduit that divides the flow and leads it to the vector system to allow the propulsion, stabilization and control systems to be driven in order to drive or control the device, or to recover the energy transmitted by the movement of the air flow leading to the recuperation.

It should be noted that, in the Figures attached with the invention, the Ram-air system is shown with straight plenum in order to simplify these Figures; for the calculation and optimization it is designed in such a way that it favours the rotation of the disc, configuring a spiral or curved shape. Calculations are done for each type of wing, taking into consideration its geometry and its maximum rotational speed.

As a further security system, the aircraft is provided with a parachuting system actuated by the pilot when an emergency takes place and there is a failure in the security system referred to above.

In one embodiment, the aircraft comprises a vertical take-off and landing system, optionally. For this, the aircraft is provided with a mechanism that allows positioning the propulsion means, particularly the vectorial nozzles of the propulsion means, perpendicularly to the ground, thus driving the apparatus vertically upwards. Another option is to provide at least a propeller 42 arranged under the fuselage and the cabin, coaxial to the vertical axis, driven by the propulsion system of the aircraft.

Figure 7A:
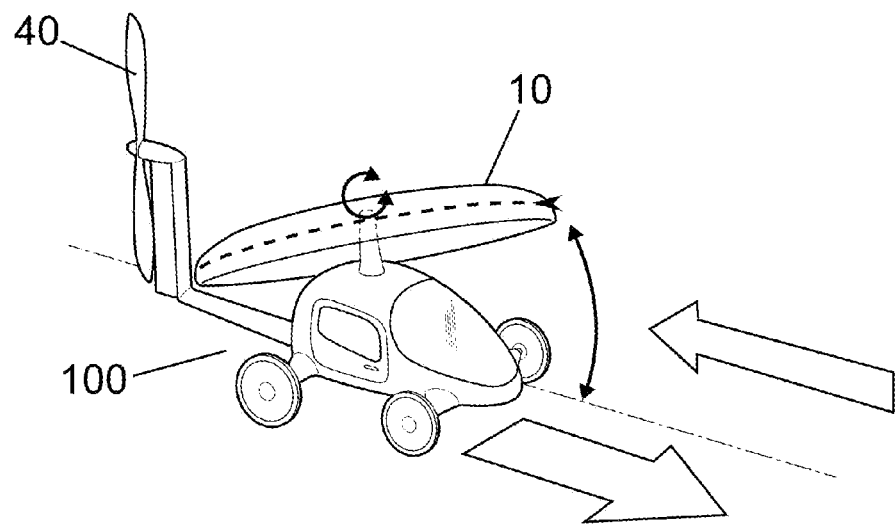
FIGS. 7a-b represent the aircraft or flying apparatus according to the invention when the angle of incidence is high and when it is low, respectively, varying the tilting of the flying wing.
Figure 7B:
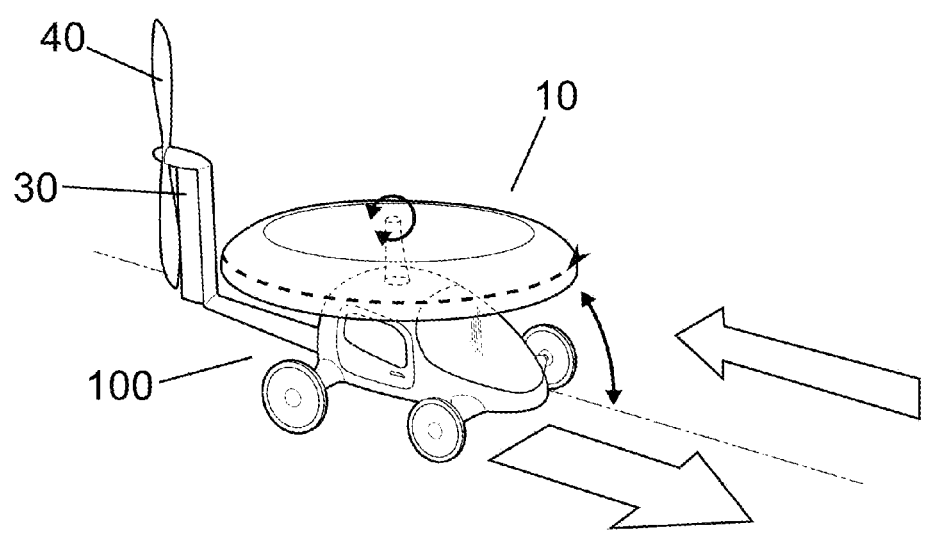

As represented in FIGS. 7*a-b*, contrary to what happens in an airplane, the angle of incidence in an aircraft or flying apparatus 100 according to the present invention changes very significantly during the flight, as the fuselage or airframe 20 swings with respect to the wing surface 10 around the hanging point, this movement or swing being necessary for the control of the aircraft. A low incidence angle is represented in FIG. 7*b*, while a high angle of incidence is shown in FIG. 7*a*.

Figure 8A:
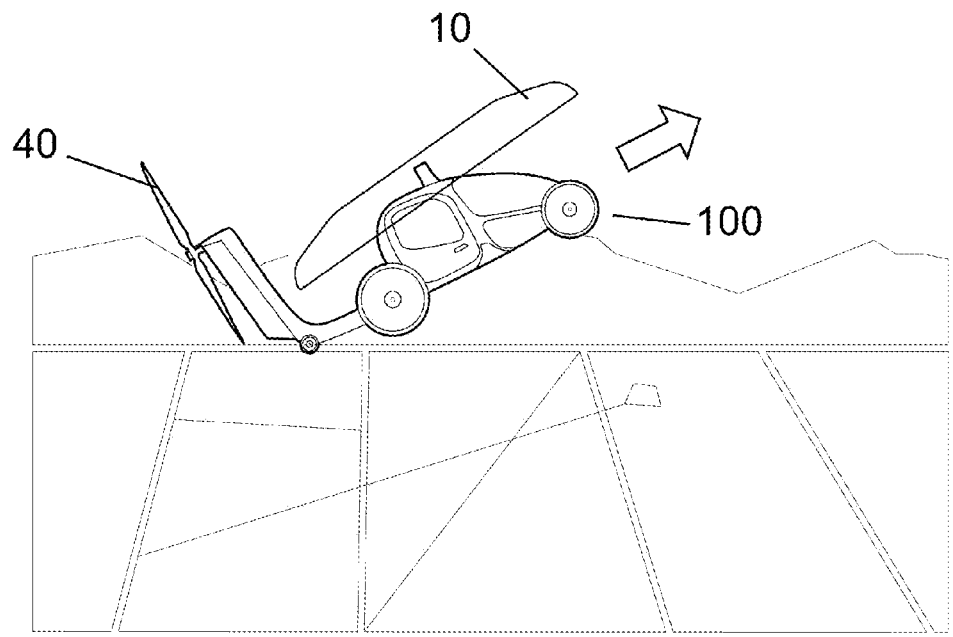
FIGS. 8a-b show the incidence of the pitch angle on a flying apparatus or aircraft according to the present invention: the arrow in these Figures indicating the trajectory, ascending (FIG. 8a) and descending (FIG. 8b).
Figure 8B:
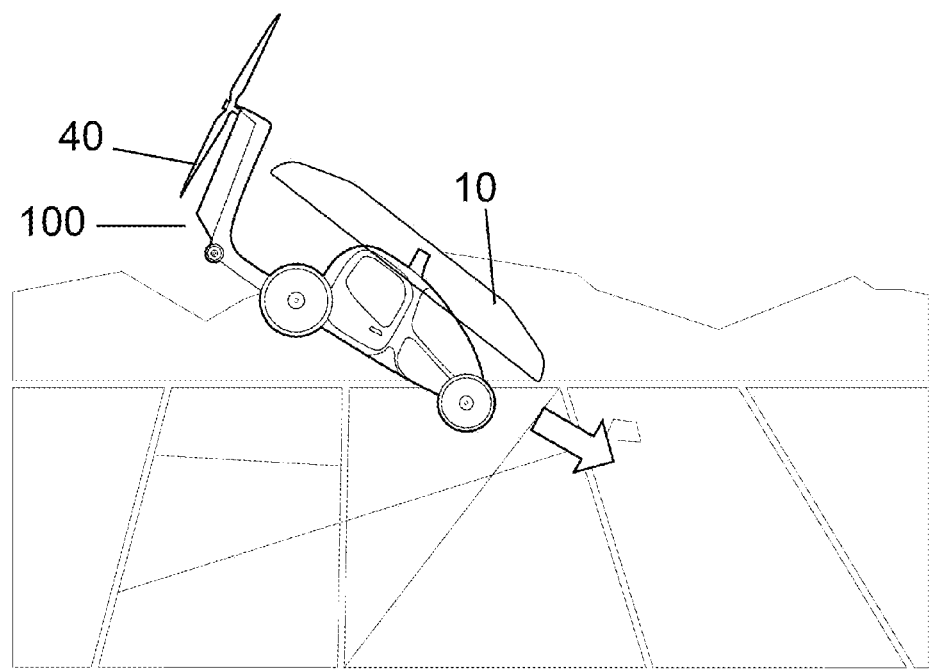

The incidence of the pitch angle is shown in FIGS. 8*a-b* with the nose of the aircraft upwards or downwards, respectively. The design of the aircraft is done such that there is stability in both conditions. The system used is similar to that in the autogiro, allowing the flying surface 10 pitch to the left or to the right, or to roll upwards or downwards, according to two independent movements, actuated by the pilot. In the helicopter or gyroplane, the pitch is changed by varying the angle of incidence or pitch of the blades; according to the invention, this is achieved by movements of the flying surface.

Yet in another possible embodiment of the invention (not shown in the figures), the aircraft can be configured as a gyroscopic apparatus rotating in one rotational axis. In this embodiment, the aircraft comprises an external cell or nacelle or fuselage shaped as a flying wing or BWB, a rotating head joined to the fuselage, an axis over which the rotating head rotates and a driving means for the rotation of the fuselage by means of a clutch that makes the axis turn or rotate once coupled to it.

Figure 6A:
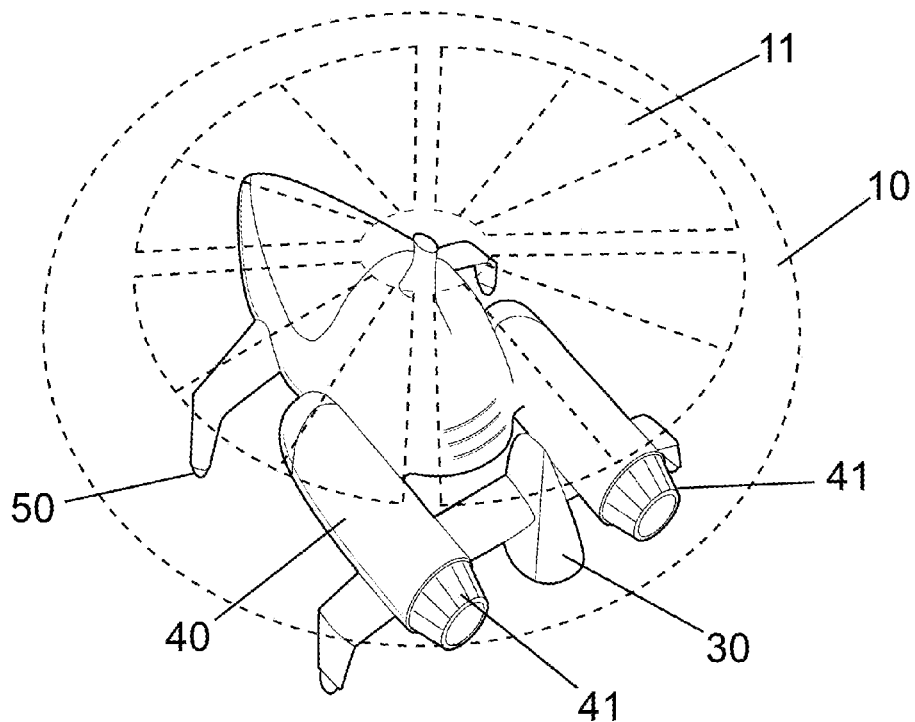
FIGS. 6a-e' show schematically different possible configurations for the flying apparatus or aircraft according to the present invention.
Figure 6B:
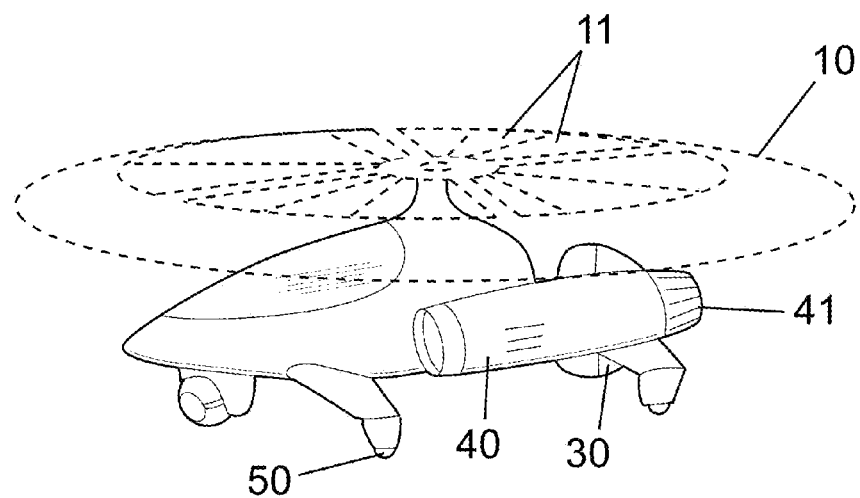

The aircraft or flying apparatus in a broader definition as the one of the invention can be configured according to several different embodiments, such as the ones mentioned below:

Unmanned Aerial Vehicle (UAV) or drone, governed by emitter and receiver, remotely (represented in FIGS. 6*a* and 6*b*).

Figures 6C, 6D:
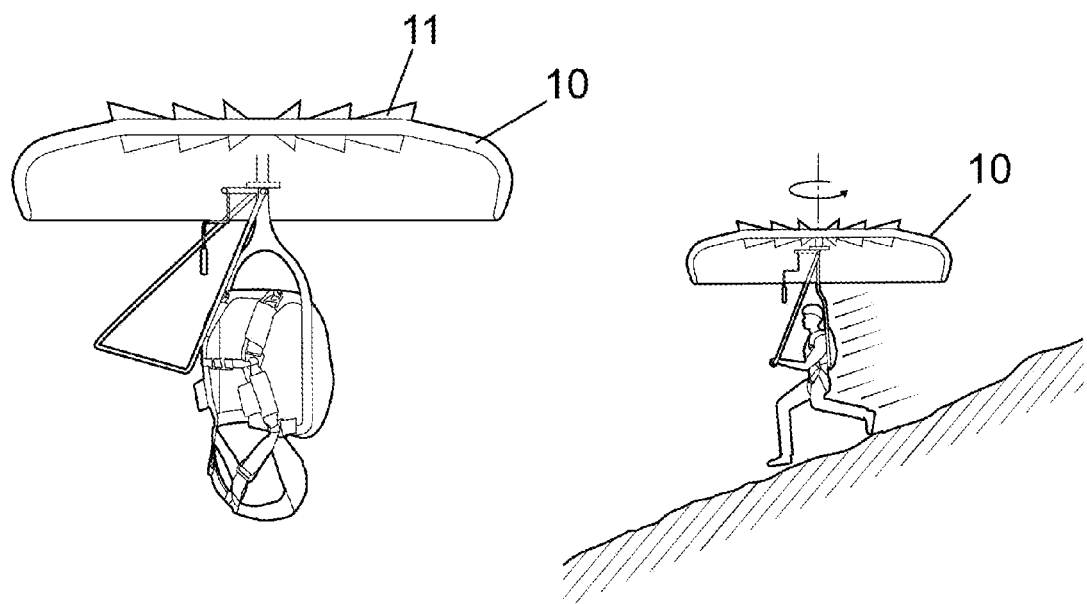
Figure 6E:
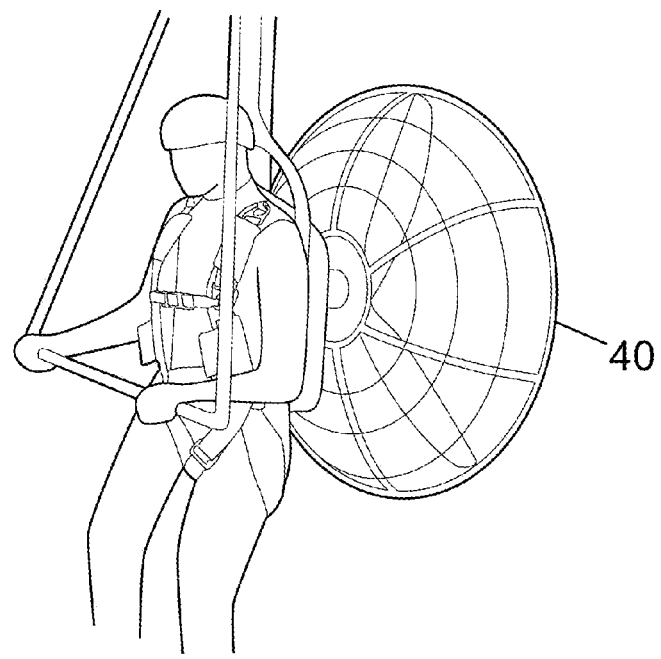
Figure 6F:
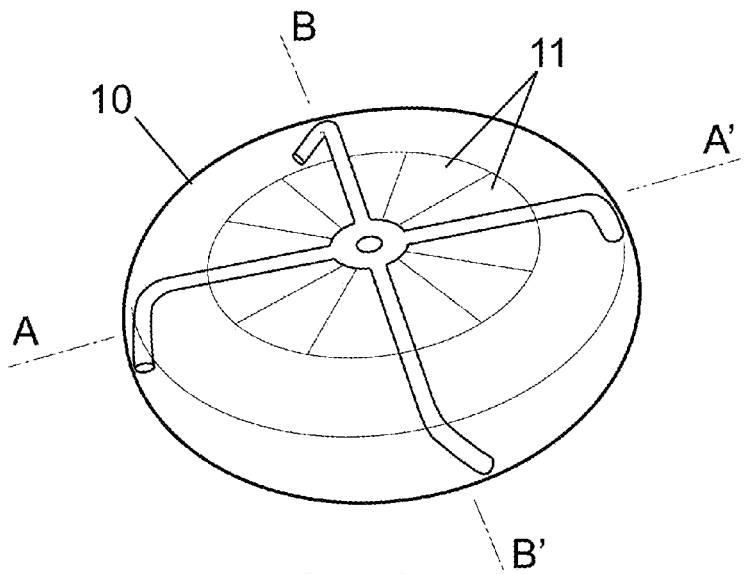
Figure 6G:
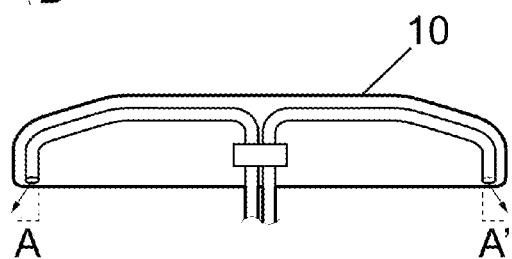
Figure 6H:
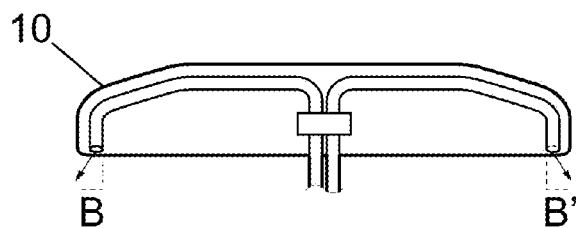
Figure 6I:
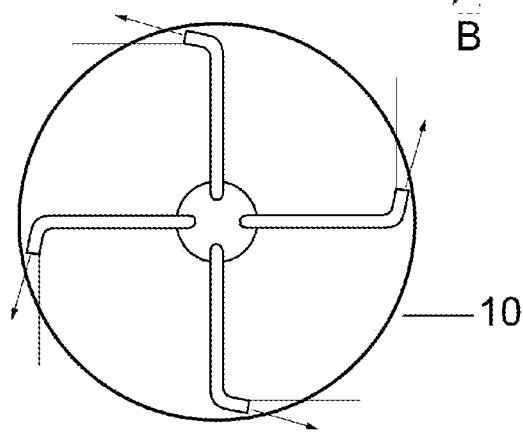
Figure 6J:
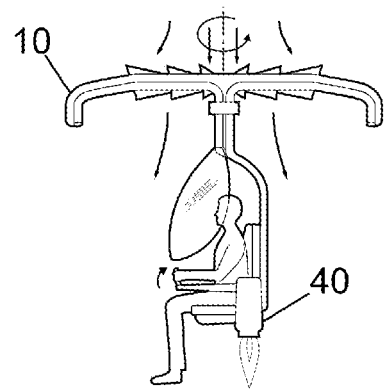
Figure 6K:
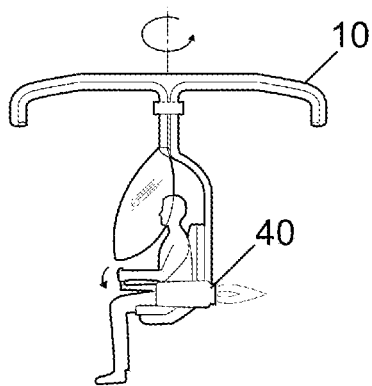
Figure 6L:
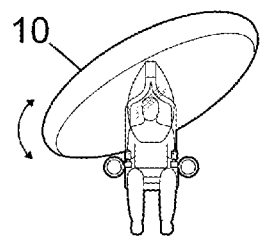
Figure 6N:
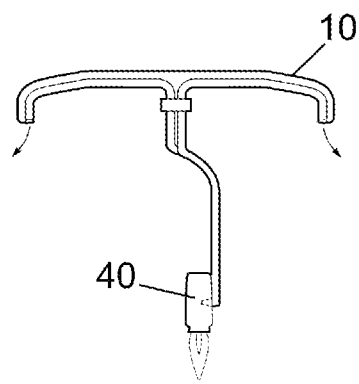
Figure 6M:
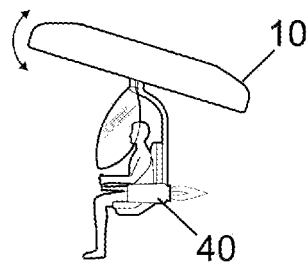
Figure 6O:
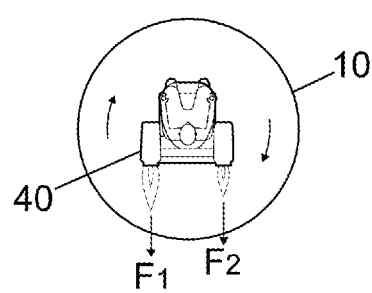
Figure 6P:
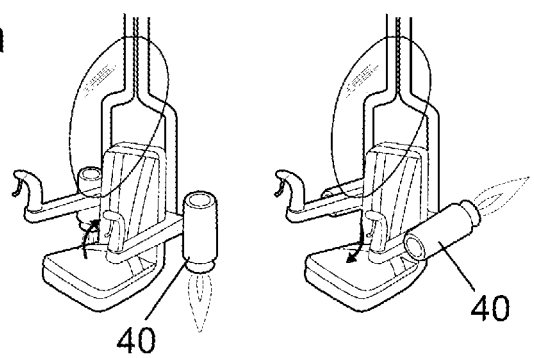

Aircraft of the delta-wing or paragliding type, apt for the free flight, as shown in FIGS. 6*c-d*: it can be motorized as the paragliding, adding on the back of the pilot a motor, as it is shown in FIG. 6*e*, who can actuate the rotating wing for example by a flexible transmission, as the pre-launcher mechanism of the autogiro.

A Jet Pack (portable aircraft of the backpack type), as represented in FIGS. 6*f-p*. In the Figures, the different moves of the apparatus are shown, such as coordinated rotations (FIG. 6*l*), pitch (FIG. 6*m*) and yaw by slowing down one of the gas exhausts: right yaw when the right gas slows down and left yaw when the left gas slows down. This move can be done not only with the Jet pack, but with any aircraft model that comprises nozzles or ducted fan.

Figure 6Q:
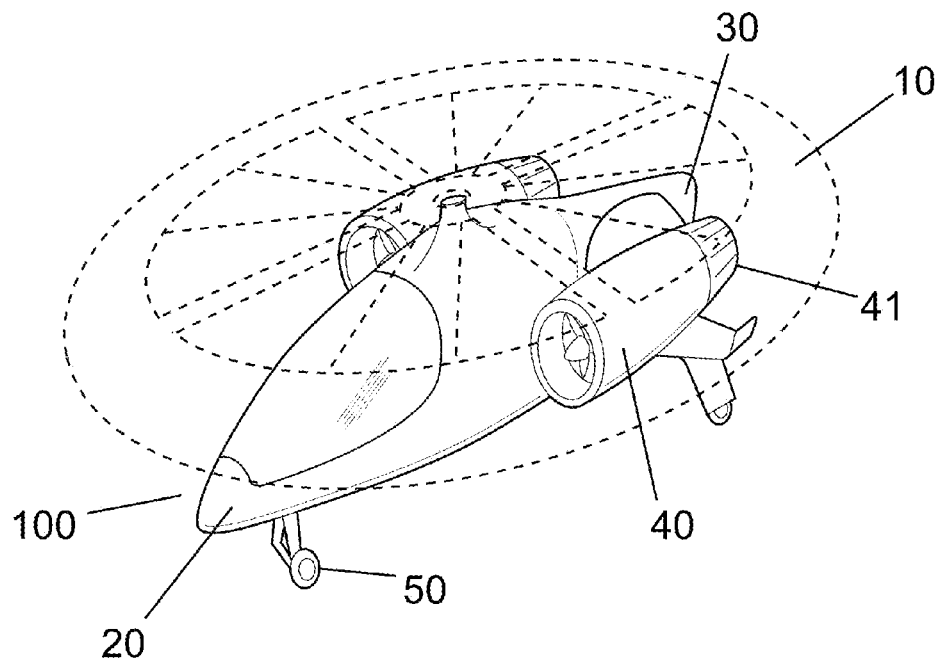

Sports ultralight aircraft, where the drive system is a propeller actuated by an electrical or a stroke engine, as shown in FIG. 6*q*.

Figure 6R:
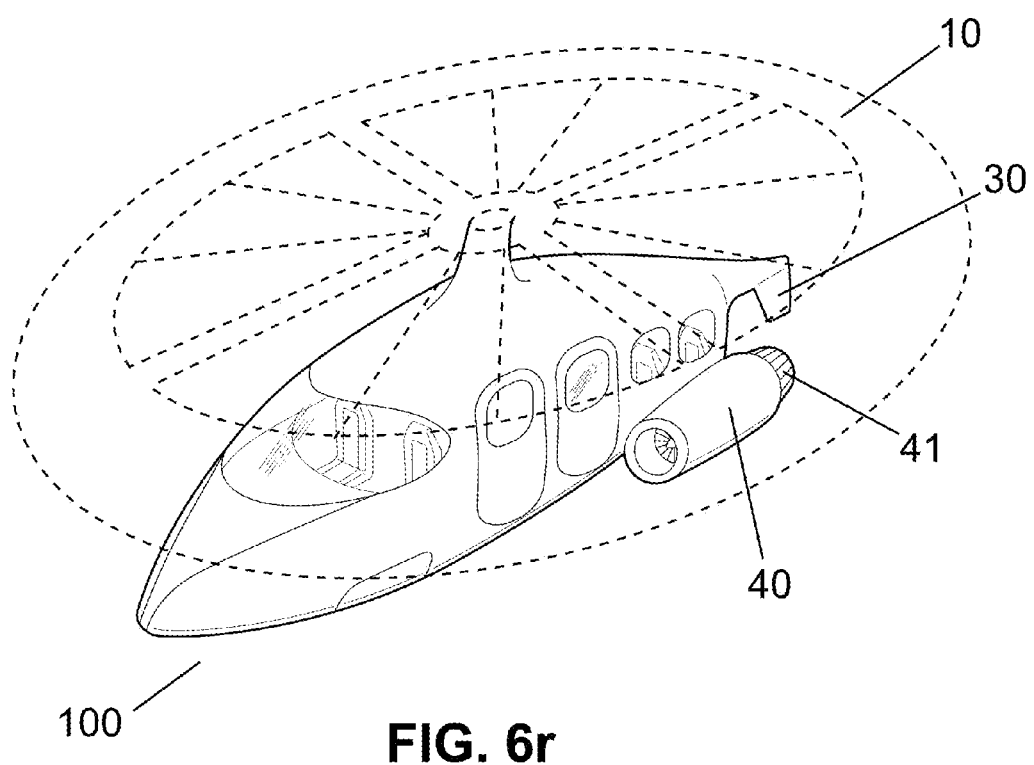

Very light aircraft jet (FIG. 6*r*).

Aircraft powered by human means (called Gyrobike or Aero cycle, as shown in FIGS. 6*s-y*): it is typically known in the state of the art as Human Powered Aircraft (HPA).

Figure 6S:
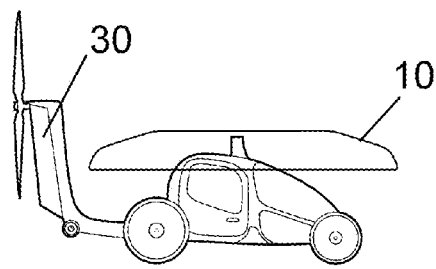
Figure 6T:
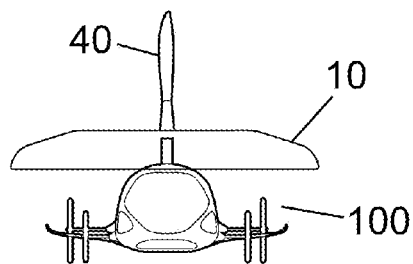

Human Powered Aircraft (HPA) with the tail in T-shape and four wheels (FIGS. 6*s-t*).

Figure 6U:
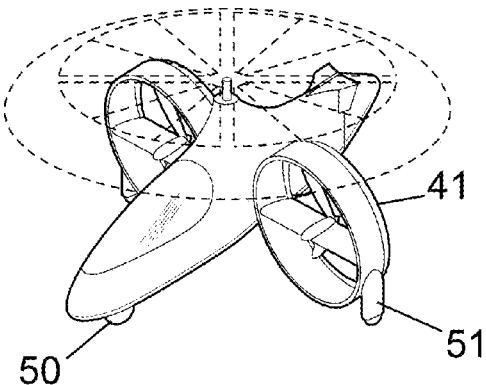
Figure 6V:
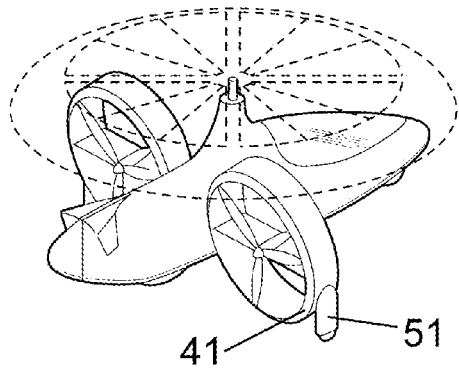
Figure 6W:
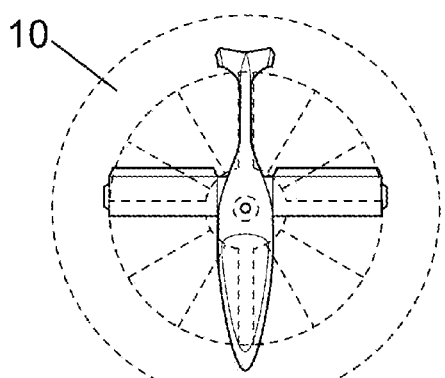
Figure 6X:
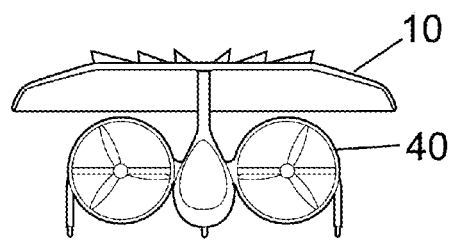
Figure 6Y:
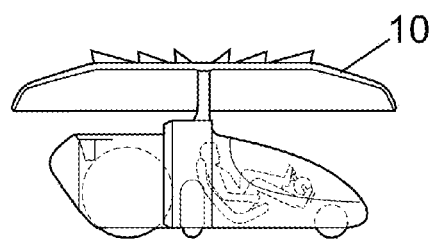

Human Powered Aircraft (HPA) with ducted fan and two wheels (FIGS. 6*u-v-w-x-y*).

Figure 6Z:
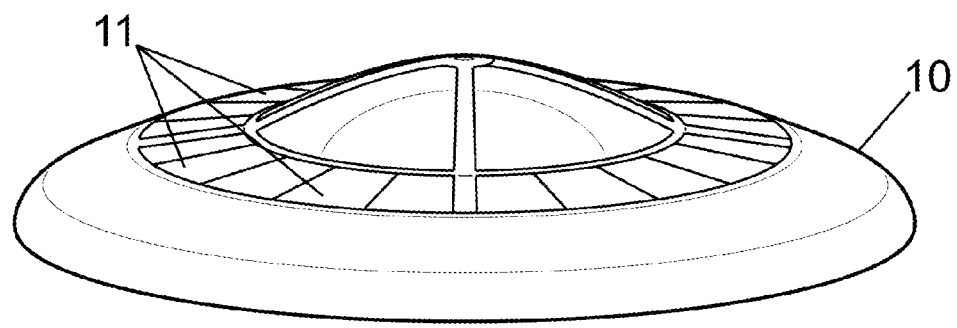
Figure 6A:
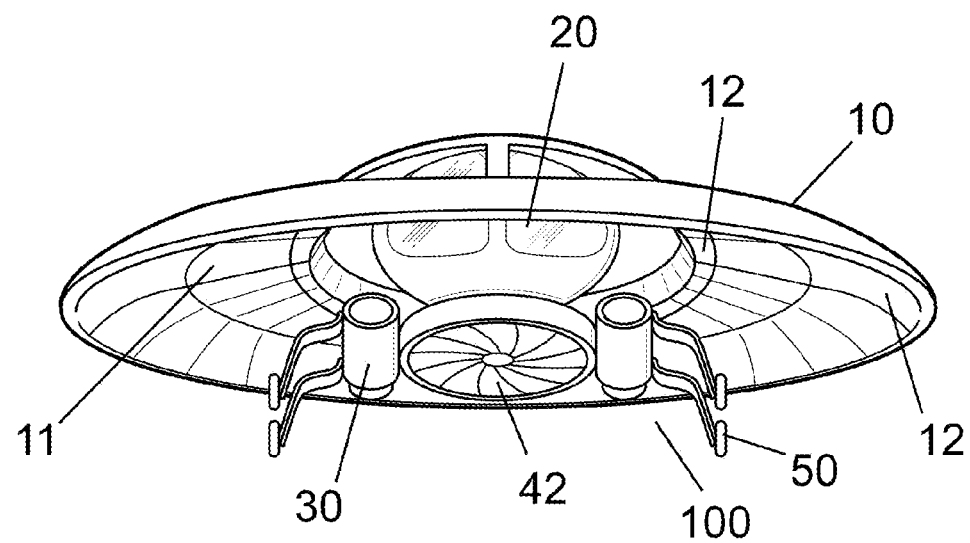
Figure 6B:
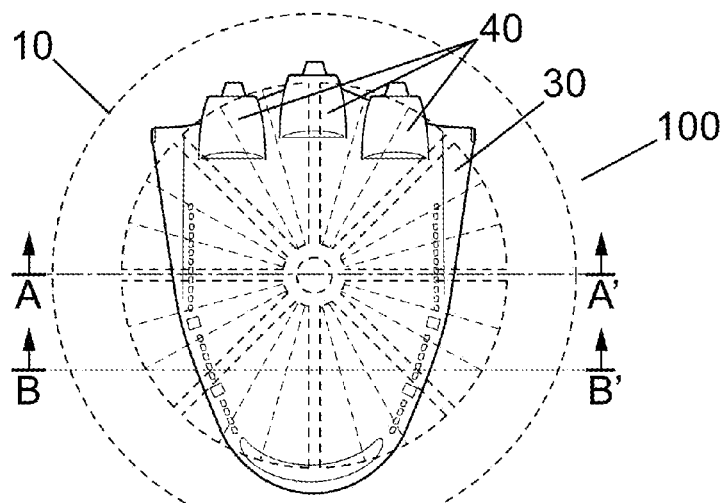
Figure 6C:
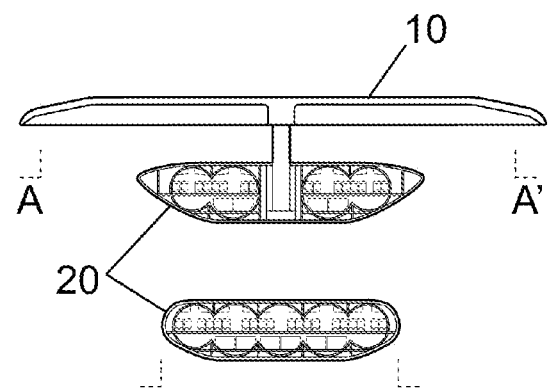
Figure 6D:
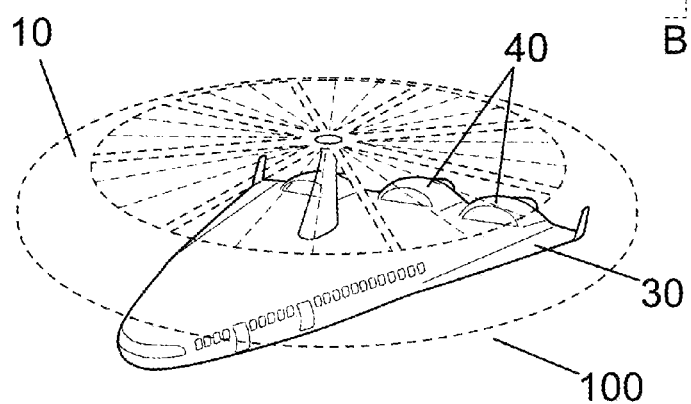
Figure 6E:
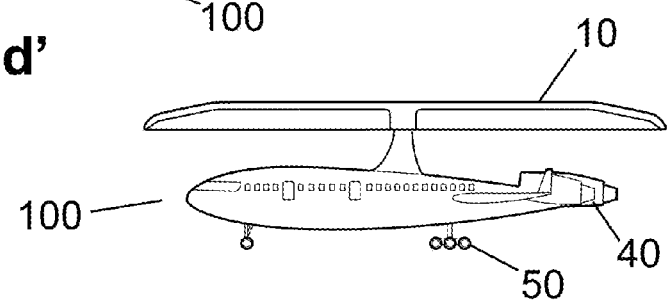

Aircraft of the type "Rotating Wing" or "Blended-Rotary-Wing Body" (BRWB), as shown in FIGS. 6*z-a'*.

Passengers' aircraft, as shown in Figures FIG. 6*b'-e'*.

There could be different types of the so-called Gyrobike configuration of the flying apparatus of the invention: the Gyrobike hanging from the rotating orientable wing and the Gyrobike with the rotating wing completely overwrapping the fuselage. This second configuration would be the more effective one, but also the most complex in terms of manufacture. There is also another possible configuration of the invention (available in Tip jet version) where the wing overwraps aerodynamically part of the cabin fuselage, making it more efficient at high speeds. Another possible configuration would be to make the cabin housing completely inside of it the disc: the cabin would then have a spherical shape so as to allow the rotation of the disc around it. This is possible by making the disc move as a gyroscope in 3D, avoiding the friction between the disc and the sphere or any other mechanical rotating means, by using magnetic levitation.

As a summary, any object submerged in a fluid is subjected to a pressure distributed over its entire surface. This pressure has a resultant of forces on the object that will cause the same to be in balance with respect to the rest of the forces to which it is subject (gravity, external forces, etc.) or to move in the direction in which the resulting from the composition of all forces act. When the fluid is in motion, the movement of this around the object produces a pressure around its contour, the pressure being now dynamic, and this is a function of the velocity of the fluid and its density. Thus, the curve representing the resistance as a function of speed has a parabolic shape, with the highest points at the speed of loss and at high speed, and the minimum resistance is an intermediate point that determines the lift/resistance ratio (L/D) maximum. When the surface of the object rotates, the fluid moves along with the object rotating with it, so if now the object is also moved longitudinally, the fluid meets a current of fluid already moving it from its path, so it starts on the object with different angle and therefore the dynamic pressure is modified. Thus, if we compare a fixed-wing aircraft with another equivalent but with the rotating wing as the invention, it is noted that the loss speed decreases and that the resulting dynamic pressure at low speed produces less resistance, making the parabola more lying. Likewise, at higher speeds the dynamic pressure is also reduced, also resulting in a wider speed range where the L/D ratio is close to the maximum. For this, it is enough to adjust the speed of rotation of the disk with the speed of advance, so that the equilibrating effect of the resultant forces is as great as possible.

The objective of the invention is not only to take advantage of the known previous phenomenon, but to use the rotation of the disc to vary the direction and sense of that resultant of forces, composing it with the moments component, so that tilting the disc with a certain angle of incidence and regulating the speed of rotation, adapting it to the speed with which it is flown, it is possible to change the component of resistances to the movement in a way that helps to propel the aircraft in another direction, and even in the same direction as the movement, instead of slowing it down. That is to say, when we drive the aircraft longitudinally, a relative wind is produced contrary to the movement of the aircraft, which we are going to take advantage of so that the one with our "sail" that is the spinning disk, pushes the aircraft in the direction we want.

The apparatus of the invention deals, therefore, with the devices that regulate the position of the resultant forces and moments by turning and orienting its rotating fuselage (or part of it), to take advantage of the precession phenomenon, that the component it moves 90° in the direction of rotation, thus modifying the trajectory, decreasing the drag or even helping in its advance. This phenomenon, discovered by the inventor of this patent, can be extrapolated to all kinds of figures and rotating bodies, whether spheres or discs, as long as the angle of incidence of the plane perpendicular to the axis of rotation of the rotating surface can be achieved. Relative wind can be regulated, and the speed of rotation is accompanied, so that the resultant to suffer the phenomenon of precession and rotate 90° change the direction of the horizontal component that opposes the movement, so that it is favourable to it. The device of the invention can also manoeuvre towards a certain direction, taking advantage of this phenomenon. To do this, it is sufficient to change the angle of incidence of the rotating object, and to regulate the speed of rotation in order to delay or advance the components of the forces and moments achieving in general, the variation of the resulting forces and moments, as desired. This is not to say that the flight is "free", since it consumes turning energy, and an impulse is needed for the flight to occur, in addition to needing to regulate the angle of incidence and the speed of rotation so that the flight be stable. What can be affirmed is that the flight is extremely efficient, since the movement against the air is used, composing it with the rotation of the disc and aided by precession, to maintain the momentum of the device, being one of the most effective ways to fly.

Although the present invention has been described with reference to preferred embodiments thereof, many modifications and alternations may be made by a person having ordinary skill in the art without departing from the scope of this invention which is defined by the appended claims.

The invention claimed is:

1. A flying apparatus comprising a main structure of airframe or fuselage and a rotative wing surface, the rotation of the rotative wing surface allowing stabilizing the apparatus during taking-off, landing and displacing through the air;
   the airframe or fuselage hanging from the rotative wing surface around a hanging point and both being operatively connected, allowing the rotative wing surface and the fuselage be moveable independently with respect to each other;
   the airframe or fuselage and the rotative wing surface being rotatable around any of three rotational axis X, Y and/or Z, independently to each other;
   wherein the rotative wing surface is configured as a disc with an orientable concave surface and comprises one or a plurality of orientable elements, acting as security and secondary command and control surfaces of the apparatus;
   and wherein the rotative wing surface is configured to modify the nautical angles yaw, pitch and/or roll of the apparatus during the flight, orienting it in the desired directions and allowing by itself effective and full maneuverability of the apparatus during the flight.

2. The flying apparatus according to claim 1 wherein the orientable elements are distributed internally on the wing surface in the form of a circular crown and wherein when flying at high speeds the disc has the orientable elements closed hermetically.

3. The flying apparatus according to claim 1 comprising a main structure of airframe or fuselage and a rotative wing surface, the wing surface overwrapping at least partially the structure of the fuselage in order to improve the aerodynamic performance.

4. The flying apparatus according to claim 1 wherein the degree of concavity of the rotative wing surface is in inverse proportion of the speed of the apparatus.

5. The flying apparatus according to claim 1 further comprising command and control surfaces, configured as orientable surfaces, arranged on the fuselage, the tail and/or on the wings of the said apparatus, acting to orientate the apparatus in the desired directions.

6. The flying apparatus according to claim 5 wherein the command and control surfaces and/or the movement of the rotative wing surface and/or the one or plurality of orientable elements and/or the fuselage is driven remotely.

7. The flying apparatus according to claim 1 wherein the rotative wing surface is actuated by propulsion means, these propulsion means being one or more of the following: human propulsion, electrical motor fed by batteries, electrical motor fed by solar energy, combustion engine, propellers, ducted fan or turbines, by means of transmission means or by means of gas discharge in tip jet system.

8. The flying apparatus according to claim 7 wherein the apparatus is driven by propulsion means arranged on the airframe or fuselage, these propulsion means being the same driving the rotative wing surface or distinct independent ones.

9. The flying apparatus according to claim 1 further comprising energy recuperating means, allowing braking or lowering the rotational speed of the rotative wing surface.

10. The flying apparatus according to claim 1 further comprising means for opening and positioning the orientable surfaces inside the rotative wing surface with respect to the ground with the adequate angle of attack to obtain maximal vertical lift in order to allow vertical take-off and/or landing.

11. The flying apparatus according to claim 1 wherein further propulsion means for vertical take-off and/or landing are provided under the airframe or fuselage coaxial or parallel to the vertical axis of the apparatus.

12. The flying apparatus according to claim 1 further comprising vectorial nozzles moveable and orientable to help the take-off and landing of the apparatus or other maneuvers, by orienting the air downwards.

13. The flying apparatus according to claim 1 further comprising a parachuting system actuated by the pilot when an emergency takes place.

14. The flying apparatus according to claim 13 wherein the rotative means are remotely actuated.

15. The flying apparatus according to claim 1 further comprising at least one of a pararotor system, an orientable pararotor, or a Ram-air system.

* * * * *